US011725942B2

United States Patent
Lam et al.

(10) Patent No.: US 11,725,942 B2
(45) Date of Patent: Aug. 15, 2023

(54) PHOTONIC INTEGRATED CHIP

(71) Applicant: DENSELIGHT SEMICONDUCTORS PTE LTD, Singapore (SG)

(72) Inventors: Yee Loy Lam, Singapore (SG); Ter Hoe Loh, Singapore (SG); Kamal Kader, Singapore (SG); Long Cheng Koh, Singapore (SG)

(73) Assignee: DENSELIGHT SEMICONDUCTORS PTE LTD, Singapore (SG)

( * ) Notice: Subject to any disclaimer, the term of this patent is extended or adjusted under 35 U.S.C. 154(b) by 0 days.

(21) Appl. No.: 17/644,682

(22) Filed: Dec. 16, 2021

(65) Prior Publication Data

US 2022/0187074 A1 Jun. 16, 2022

Related U.S. Application Data

(60) Provisional application No. 63/126,174, filed on Dec. 16, 2020.

(51) Int. Cl.
| | |
|---|---|
| *G01C 19/72* | (2006.01) |
| *G02B 6/12* | (2006.01) |
| *G02B 6/13* | (2006.01) |

(52) U.S. Cl.
CPC ....... *G01C 19/721* (2013.01); *G02B 6/12004* (2013.01); *G02B 6/13* (2013.01);
(Continued)

(58) Field of Classification Search
CPC .............................. G01C 19/72–728
See application file for complete search history.

(56) References Cited

U.S. PATENT DOCUMENTS

| 7,403,678 B2 * | 7/2008 | Thapliya | G02F 1/3132 |
| | | | 385/20 |
| 10,274,319 B2 * | 4/2019 | Wang | G01C 19/726 |
| 10,731,988 B1 * | 8/2020 | Paniccia | G01C 19/721 |

FOREIGN PATENT DOCUMENTS

| KR | 101704731 B1 | 2/2017 |
| KR | 101828061 B1 | 2/2018 |

OTHER PUBLICATIONS

Hongwei Zhao et al., "High-Power Indium Phosphide Photonic Integrated Circuits", IEEE Journal of Selected Topics in Quantum Electronics, vol. 25, issue 6, pp. 1-10, Apr. 2, 2019.
(Continued)

*Primary Examiner* — Charlie Y Peng
(74) *Attorney, Agent, or Firm* — Chip Law Group

(57) ABSTRACT

A photonic integrated chip is configured as a transmitter-receiver chip. The photonic integrated chip includes a light emitter, a light detector, a multi-mode interference coupler, and a mode-filed adapter. The light emitted by the light emitter is guided to a core layer formed below the multi-mode interference coupler, and further to the mode-filed adapter for transmission of light to an optical fiber coupled with the photonic integrated chip. Similarly, light received by the mode-filed adapter from the optical fiber propagates to the core layer, and is guided by the multi-mode interference coupler into the light detector. The photonic integrated chip is utilized to realize a single-unit transmitter-receiver module for a fiber optic gyroscope circuit based on monolithic integration of photonics components via wafer fabrication on a substrate. The photonic integrated chip has a low fabrication cost, low size, and is robust.

16 Claims, 17 Drawing Sheets

(52) U.S. Cl.
CPC .............. *G02B 2006/12035* (2013.01); *G02B 2006/12152* (2013.01)

(56) References Cited

OTHER PUBLICATIONS

International Search Report and Written Opinion in PCT/IB2021/061884 dated Mar. 23, 2022.
Stanislaw Stopinski et al., "An Interferometric Fiber-Optic Gyroscope System Based on an Application Specific Photonic Integrated Circuit", 2017 European Conference on Lasers and Electro-Optics and European Quantum Electronics Conference (Optica Publishing Group, 2017), paper CH_7_1, Jun. 25, 2017.

\* cited by examiner

PHOTONIC INTEGRATED CHIP

CROSS REFERENCE TO RELATED APPLICATIONS

This application claims priority benefit of U.S. Provisional Application No. 63/126,174 filed in the US Patent Office on Dec. 16, 2020. The above-referenced application is hereby incorporated herein by reference in its entirety.

FIELD

Various embodiments of the disclosure relate generally to transceiver circuitry. More particularly, various embodiments of the present disclosure relate to a photonic integrated chip.

BACKGROUND

Light-weight and compact Fiber Optic Gyroscope (FOG) is one of the key enablers for navigation applications in new emerging markets of Unmanned Aerial Vehicles (UAV), drones, and robotics automation. Traditionally, manufacturers of such sensor systems have been utilizing FOG-based navigation systems. Typically, a FOG uses an optical fiber sensor coil, phase-modulators, and transmit-receive optical circuitry comprising several discrete optical components, such as Superluminescent Light Emitting Diode (SLED), directional couplers, and PIN-photodetectors, that are fiber-spliced together to form the optical circuit for SAGNAC interferometry. However, to manufacture such transmit-receive optical circuitry, multiple discrete optical components are manually assembled by performing multiple operations of fiber splicing to make polarization maintaining-fiber (PMF) connections. Since it is an important requirement for the FOG system to be physically as small in size as possible, the FOG system builders have to perform the sub-assembly of transmit-receive circuitry in tight proximity integration with the sensing circuitry to ensure a compact assembly outcome, which is undesirable.

In light of the foregoing, there is a need for a technical solution that overcomes the above-mentioned problems in the transmit-receive circuitry in FOGs.

SUMMARY

A system and method for Indium Phosphide (InP) photonic integrated transceiver for fiber optic gyroscope (FOG) is provided substantially as shown in and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another and vice versa.

Various embodiments of the present disclosure are illustrated by way of example, and not limited by the appended figures, in which like references indicate similar elements.

DETAILED DESCRIPTION

Figure 1:
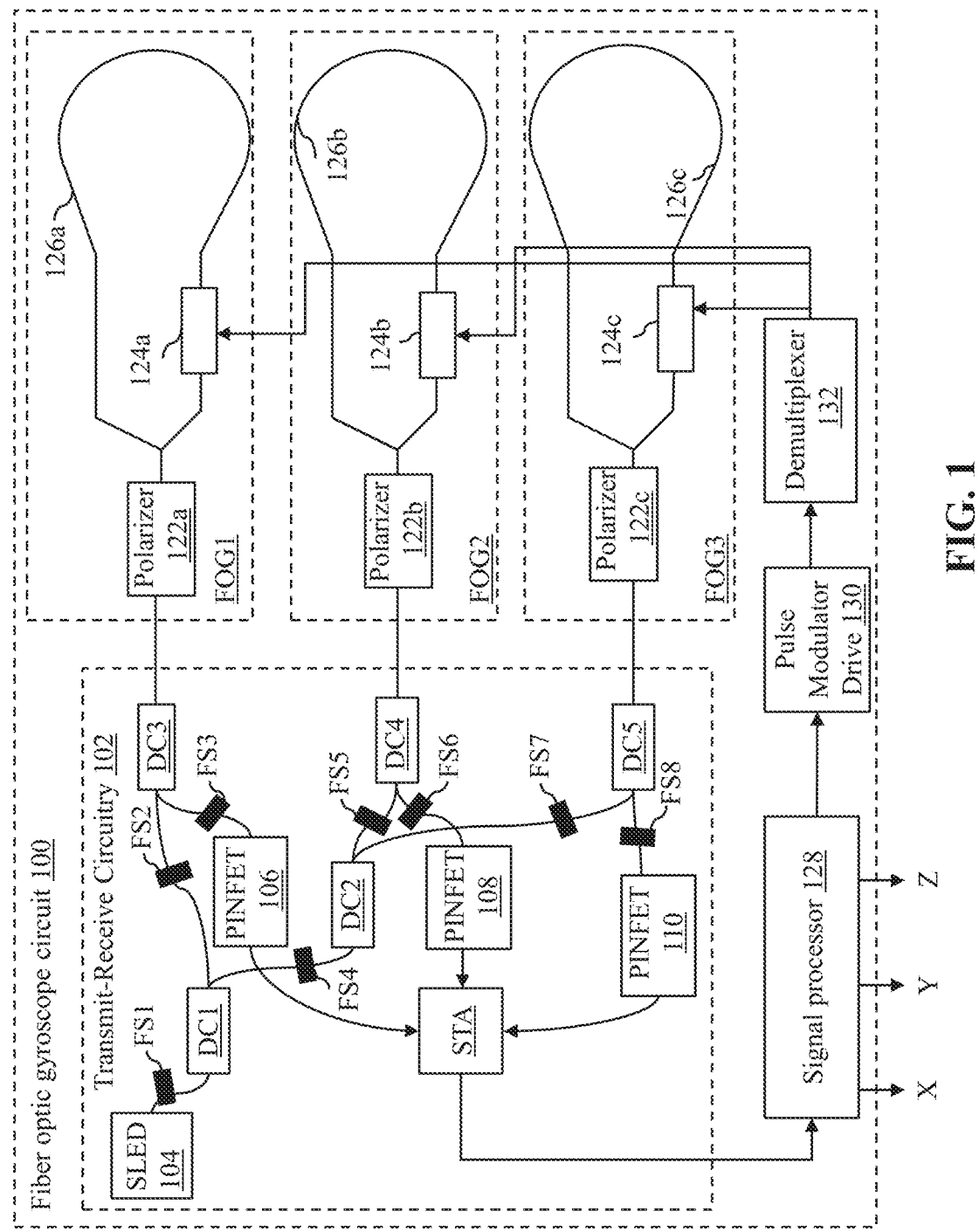
FIG. 1 is a schematic diagram that illustrates a conventional 3-axis fiber optic gyroscope circuit.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

This disclosure relates to Indium Phosphide (InP) Photonic Integrated Transceiver for Fiber Optic Gyroscope (FOG). The present disclosure relates to realizing a 3-axis transmit-receive circuitry (hereinafter, interchangeably referred to as "transceiver") as a single-unit based on monolithic integration of key photonics components via wafer fabrications on Indium Phosphide (InP) substrate. For realizing the FOG of the present disclosure, the conventional 3-axis transmit-receive circuitry is replaced with a single-unit transceiver photonic integrated chip (TRX-PIC) module.

In an embodiment, a photonic integrated chip is disclosed. The photonic integrated chip comprises a light emitter, a light detector, a multimode interference coupler, and a mode-field adapter. The light emitter is configured to emit light. The mode-field adapter is configured to at least one of (i) transmit light based on the emitted light by the light emitter and (ii) receive light. Based on the reception of the received light by the mode-field adapter, the light detector is configured to detect the received light. The light emitter and the light detector are formed above the multimode interference coupler, and the mode-field adapter is formed adjacent to the multimode interference coupler. The multimode interference coupler couples the light emitter to the mode-field adapter such that the emitted light is propagated from the light emitter to the mode-field adapter, and the multimode interference coupler couples the light detector to the mode-field adapter such that the received light is propagated from the mode-field adapter to the light detector.

In some embodiments, the photonic integrated chip further comprises a photodiode. The light emitter is coupled to the multimode interference coupler at a front facet of the light emitter, and a back facet of the light emitter is coupled to the photodiode.

In some embodiments, a back facet of the light detector and a back facet of the photodiode are coated with an anti-reflection coating.

In some embodiments, the light emitter is a superluminescent light emitting diode.

In some embodiments, the light detector is a photodetector.

In some embodiments, the photonic integrated chip is formed from a plurality of layers that comprise a substrate, a passive waveguide core layer, a passive waveguide cladding layer, a first etch stop layer, an n-contact layer, a second etch stop layer, an n-cladding layer, an active layer, a p-cladding layer, and a p-metal layer. The passive waveguide core layer is grown above the substrate. The passive waveguide core layer is configured as a first core. The first core is lattice-matched with the substrate, and the first core is undoped. The passive waveguide cladding layer is grown on the passive waveguide core layer. A first waveguide path, a second waveguide path, and a third waveguide path are formed from the passive waveguide cladding layer. An output end of the third waveguide path is tapered to form the mode-field adapter. The first etch stop layer is grown on the passive waveguide cladding layer. The n-contact layer is grown on the first etch stop layer. The second etch stop layer is grown on the n-contact layer. The n-cladding layer is grown on the second etch stop layer. The active layer is configured as a second core and grown on the n-cladding layer. The second core has a lower bandgap as compared with the first core. The p-cladding layer is grown on the active layer. The p-metal layer is grown on the p-cladding layer.

In some embodiments, the p-cladding layer, the active layer, and the n-cladding layer are patterned to form the light emitter. The light emitter is formed above the first waveguide path, and the second core is tapered such that the emitted light propagates from the second core to the first core by way of adiabatic coupling between the second core and the first core.

In some embodiments, the p-cladding layer, the active layer, and the n-cladding layer are patterned to form the light detector. The light detector is formed above the second waveguide path, and the second core is tapered such that the received light propagates from the first core to the second core by way of adiabatic coupling between the first core and the second core.

In some embodiments, isolation trenches formed at an oblique angle near an output end of the mode-field adapter. The isolation trenches are formed on the passive waveguide core layer.

In some embodiments, the p-cladding layer, the active layer, and the n-cladding layer are patterned to form the light detector. The light detector is formed above the second waveguide path, and the second core is tapered such that the received light propagates from the first core to the second core by way of adiabatic coupling between the first core and the second core.

In some embodiments, the active layer comprises a stack of quantum wells. Each adjacent quantum well of the stack of quantum wells is separated by a corresponding barrier layer.

In some embodiments, the photonic integrated chip further comprises a third core layer and a third cladding layer. The third core layer is configured as a third core. The third core is formed on the substrate, and the third core has a lower refractive index with respect to the substrate. The first core is tapered such that at least one of (i) the emitted light propagates from the first core to the third core and (ii) the received light propagates from the third core to the first core.

The third cladding layer is formed above the third core. The passive waveguide core layer is formed above the third cladding layer.

In some embodiments, the third core comprises a plurality of alternating thin Indium Gallium Arsenide Phosphide (InGaAsP) layers and thick InP layers. A thickness of each of the thin InGaAsP layer is 30-40 nanometres (nm), and a thickness of each of the thick InP-layer is 500-550 nm.

In some embodiments, an output end of the mode-field adapter is tapered for coupling with an optical fiber.

In some embodiments, the photonic integrated chip is mounted and bonded by thermal-conductive materials on a ceramic submount, and the photonic integrated chip is included in a fiber optic gyroscope circuit.

In some embodiments, the photonic integrated chip is divided into a plurality of channels comprising a first channel, a second channel, and a third channel. Each channel of the plurality of channels is isolated from other channels of the plurality of channels. The first channel includes the light emitter, the light detector, the mode-field adapter, and the multimode interference coupler. Each of the second channel and the third channel comprises a corresponding light emitter, a corresponding light detector, a corresponding mode-field adapter, and a corresponding multimode interference coupler.

In another embodiment, a method of fabricating the photonic integrated chip is disclosed. The method comprises growing a passive waveguide core layer above a substrate, growing a passive waveguide cladding layer on the passive waveguide core layer, forming a first plurality of layers on the passive waveguide cladding layer, growing a second plurality of layers on the first plurality of layers, patterning the second plurality of layers to form a light emitter and a light detector, and patterning the passive waveguide cladding layer. A first waveguide path, a second waveguide path, and a third waveguide path of the patterned passive waveguide cladding layer form a multimode interference coupler. The light emitter is formed above the first waveguide path, and the light detector is formed above the second waveguide path. The method further comprises patterning an end of the third waveguide path of the passive waveguide cladding layer to form a mode-field adapter. The multimode interference coupler, the light emitter, the mode-field adapter, and the light detector form a photonic integrated chip.

In some embodiments, the forming of the first plurality of layers on the passive waveguide cladding layer comprises growing a first etch stop layer on the passive waveguide cladding layer, growing an N-contact layer on the first etch stop layer, growing a second etch stop layer on the N-contact layer, and patterning each of the first etch stop layer, the N-contact layer, and the second etch stop layer after the second plurality of layers are patterned.

In some embodiments, the growing of the second plurality of layers on the first plurality of layers comprises growing an N-cladding layer on top of the second etch stop layer, growing an active layer on the N-cladding layer, and growing a P-cladding layer on the active layer.

In some embodiments, the patterning of the second plurality of layers comprises etching the P-cladding layer, the active layer, and the N-cladding layer to form at least one of the light emitter and the light detector, forming deep isolation trenches on a first side of the light emitter and a second side of the light detector, forming a P metal layer on top of the patterned P-cladding layer, and forming an N metal contact layer on each side of the second etch stop layer and on top of the patterned N-contact layer.

FIG. 1 is a schematic diagram that illustrates a conventional three-axis fiber optic gyroscope circuit 100. The conventional three-axis fiber optic gyroscope circuit 100 includes a transmit-receive circuitry 102 having discrete optical components. In the fiber optic gyroscope circuit 100, three fiber optic gyroscopes FOG1-FOG3 associated with a corresponding axis (i.e., FOG1 associated with the X-axis, FOG2 associated with the Y-axis, and FOG3 associated with the Z-axis) share one standalone high power superluminescent light emitting diode (SLED) light source 104. The SLED light source 104 is coupled to a series of directional couplers (DC1-DC5) which split the optical power almost equally in each of the fiber-loop for each axis. The loop-circulated light is directed back to the directional couplers DC1-DC5 into p-intrinsic-n field effect transistors (PINFET) 106, 108, and 110 for detection of the light emitted by the SLED light source 104. A set of transimpedance amplifiers STA converts photocurrent signals associated with the three axes and that are received from the PINFETs 106, 108, and 110 to voltage signals which are fed into the signal processor 128.

Each of the three fiber optic gyroscopes FOG1, FOG2, and FOG3 includes a corresponding polarizer, a phase modulator, and a fiber coil. Thus, the fiber optic gyroscope FOG1 includes a polarizer 122a, a phase modulator 124a, and a fiber coil 126a. The fiber optic gyroscope FOG2 includes a polarizer 122b, a phase modulator 124b, and a fiber coil 126b. The fiber optic gyroscope FOG3 includes a polarizer 122c, a phase modulator 124c, and a fiber coil 126c. The conventional transmit-receive circuitry 102 is further coupled with a signal processor 128. The signal processor 128 is coupled with a phase modulator drive 130 that is further coupled with a demultiplexer 132. The demultiplexer 132 is coupled with the three fiber optic gyroscopes FOG1, FOG2, and FOG3. The disadvantage of having such transmit-receive circuitry 102 in the conventional three-axis fiber optic gyroscope circuit 100 is that it requires manual assembly of the nine optical parts (e.g., five directional couplers DC1-DC5, three PINFETs 106-110, and the SLED light source 104), along with eight operations of fiber splicing FS1-FS8 to make polarization maintaining-fiber connections. The functioning of the three fiber optic gyroscopes FOG1, FOG2, and FOG3, the signal processor 128, the phase modulator drive 130, and the demultiplexer 132 will be apparent to a person skilled in the art.

Figure 2:
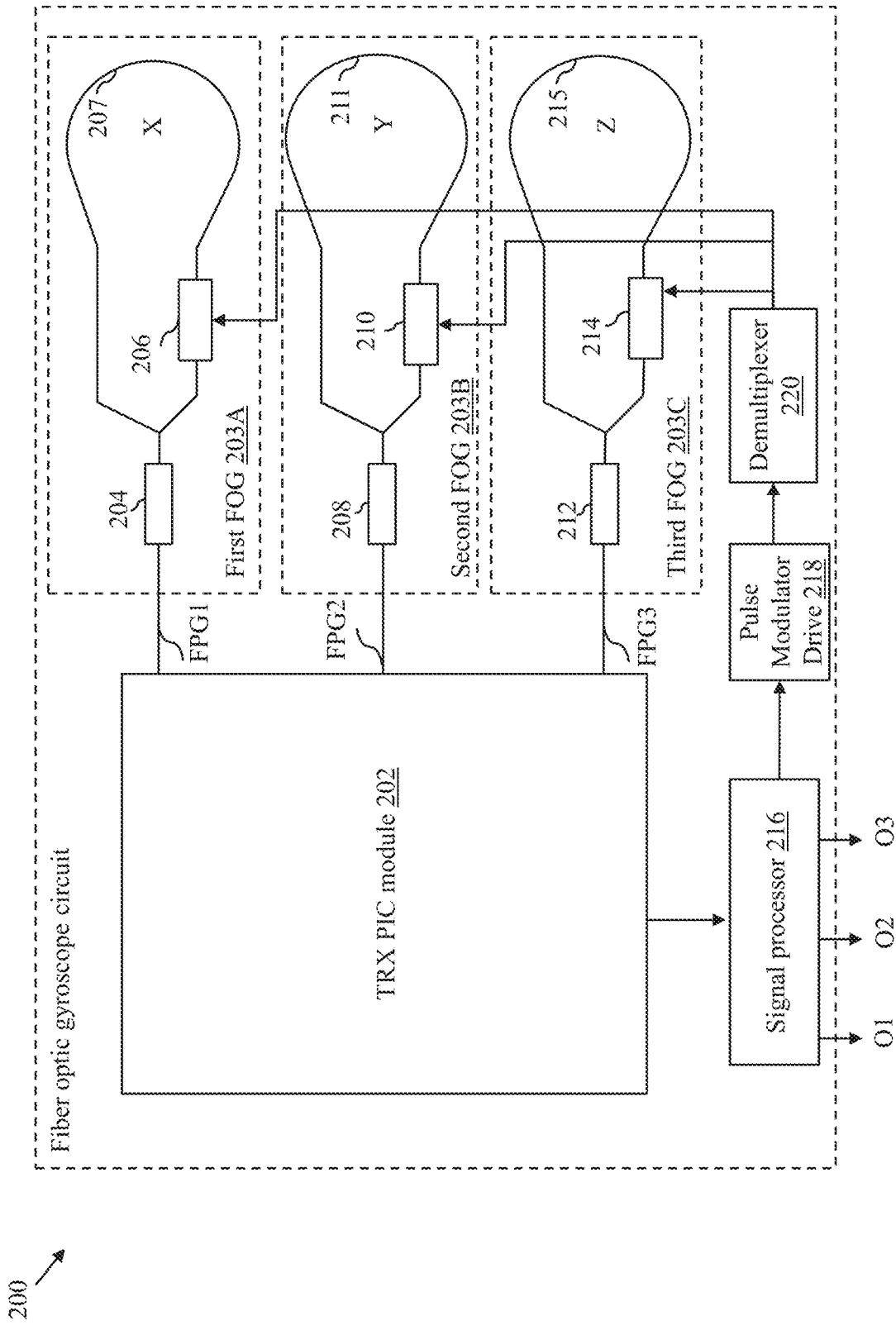
FIG. 2 is a schematic diagram that illustrates a fiber optic gyroscope circuit, in accordance with an exemplary embodiment of the present disclosure.

FIG. 2 is a schematic diagram that illustrates a fiber optic gyroscope circuit (FOG) 200, in accordance with an exemplary embodiment of the present disclosure. The FOG circuit 200 includes a single unit transmit-receive-photonic integrated circuit (TRX-PIC) module 202, a first FOG 203A, a second FOG 203B, and a third FOG 203C. The first FOG 203A includes a first polarizer 204, a first phase modulator 206, and a first fiber coil 207. The second FOG 203B includes a second polarizer 208, a second phase modulator 210, and a second fiber coil 211. The third FOG 203C includes a third polarizer 212, a third phase modulator 214, and a third fiber coil 215. In the present disclosure, the conventional transmit-receive circuitry 102 is replaced with a single-unit TRX-PIC module 202. The size of the TRX-PIC module 202 is much smaller than the conventional transmit-receive circuitry 102. Further, the size of the TRX-PIC module 202 is not larger than the typical size of any of the nine optical components of the conventional transmit-receive circuitry 102. Therefore, there is a significant size reduction for the TRX-PIC module 202, and in turn of the FOG circuit 200. Furthermore, as the FOG circuit 200 does not need to perform any sub-assembly operations for the TRX-PIC module 202, the amount of time and effort to build the FOG circuit 200 is significantly reduced using the single-unit TRX-PIC module 202.

The FOG circuit 200 further includes three polarization maintaining-fiber (PMF) pigtails such as a first PMF pigtail FPG1, a second PMF pigtail FPG2, and a third PMF pigtail FPG3. The second PMF pigtail FPG2 and the third PMF pigtail FPG3 are structurally and functionally similar to the first PMF pigtail FPG1. The first FOG 203A is coupled with the TRX-PIC module 202 by way of the first fiber pigtail FPG1. Further, the second FOG 203B is coupled with the TRX-PIC module 202 by way of the second PMF pigtail FPG2, and the third FOG 203C is coupled with the TRX-PIC module 202 by way of the third PMF pigtail FPG3.

The TRX-PIC module 202 emits light in each of the first FOG 203A, the second FOG 203B, and the third FOG 203C. Each of the first FOG 203A, the second FOG 203B, and the third FOG 203C can measure rotation around a corresponding axis: X, Y, and Z, respectively. Each of the first polarizer 204, the second polarizer 208, and the third polarizer 212 are configured to pass light waves of a certain polarization to the corresponding fiber coil and block light waves of a different polarization. Each of the first phase modulator 206, the second phase modulator 210, and the third phase modulator 214 control an optical phase of the light wave. The phase modulator drive 218 passes an output of the signal processor 216 to a corresponding phase modulator such as one of the first phase modulator 206, the second phase modulator 210, and the third phase modulator 214, by way of the demultiplexer 220.

Based on the received light from each of the first FOG 203A, the second FOG 203B, and the third FOG 203C, the voltage outputted from the TRX-PIC module 202 is provided to the signal processor 216 to filter DC components in the voltage. The signal processor 216 outputs x, y, z output accelerations, x, y, z angular rates (denoted as 'O1', O2', and 'O3' respectively, in FIG. 2), and output temperature of the TRX-PIC module 202. The signal processor 216 provides a signal corresponding to the output acceleration and the angular rate to the phase modulator drive 218.

Though the FOG circuit 200 is shown to include all three of the first FOG 203A, the second FOG 203B, and the third FOG 203C, to measure the rotation around a single axis (i.e., one of the X-axis, the Y-axis, and the Z-axis), the FOG circuit 200 may include a single FOG such as one of the first FOG 203A, the second FOG 203B, and the third FOG 203C.

Figure 3:
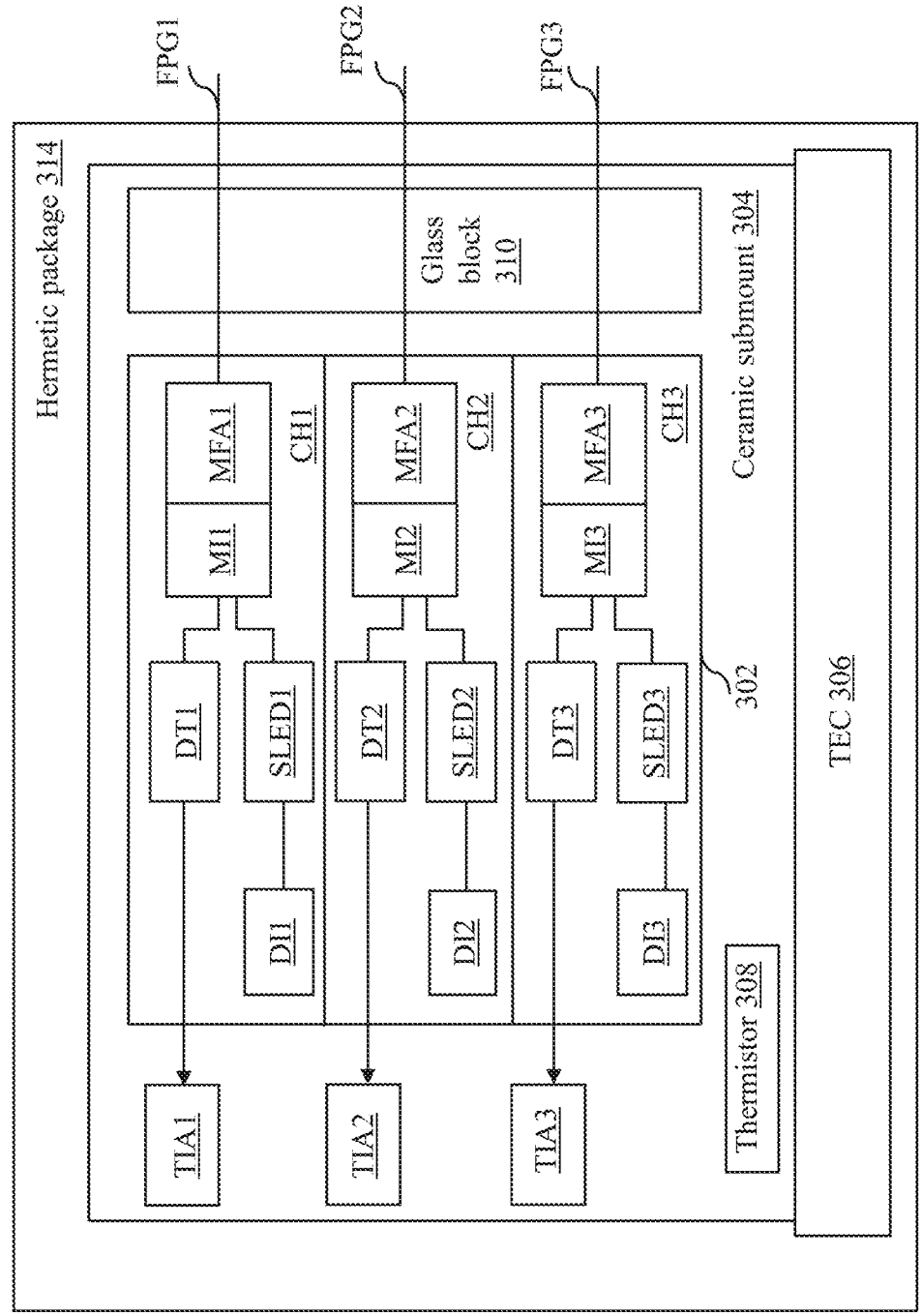
FIG. 3 is a schematic diagram that illustrates a transmitter-receiver (TRX)-photonic integrated circuit (PIC) module of the fiber optic gyroscope circuit of FIG. 2, in accordance with an exemplary embodiment of the present disclosure.

FIG. 3 is a schematic diagram that illustrates the TRX-PIC module 202, in accordance with an exemplary embodiment of the present disclosure. The TRX-PIC module 202 includes a single InP photonic integrated chip 302, hereinafter referred to as a "photonic integrated chip 302". The photonic integrated chip 302 is implemented with InP-based monolithic integration wafer fabrication processing techniques as explained in FIG. 6.

The photonic integrated chip 302 includes three independent waveguided channels of photonics transmit-receive functions. In other words, the photonic integrated chip 302 is divided into a plurality of channels comprising a first channel CH1, a second channel CH2, and a third channel CH3. Each channel of the plurality of channels is isolated from other channels of the plurality of channels. Thus, the first channel CH1 is isolated from the second channel CH2 and the third channel CH3. Further, the second channel CH2 is isolated from the third channel CH3. The first channel CH1 includes a first light emitter SLED1 such as an SLED broadband light source, a first light detector DT1 such as a (positive-intrinsic-negative) P-I-N photodetector, a multimode interference coupler MI1 such as a 2×1 multimode interference coupler, and a first mode-field adapter MFA1. The first channel CH1 of the photonic integrated chip 302 may further include a first monitor photodiode DI1. The first mode-field adapter MFA1 is configured to modify an optical mode for improved mode coupling to an optical fiber (not shown). Similarly, the second channel CH2 includes a corresponding second light emitter SLED2, a corresponding second light detector DT2, a corresponding second mode-field adapter MFA2, and a corresponding second multimode interference coupler MI2. Further, the third channel CH3 includes a corresponding third light emitter SLED3, a corresponding third light detector DT3, a corresponding third mode-field adapter MFA3, and a corresponding third multimode interference coupler MI3. The photonic integrated chip 302 is a single integrated chip such that all components of the photonic integrated chip 302 are formed on the same chip.

The photonic integrated chip 302 is bonded on a ceramic submount 304 that is typically fabricated using Aluminum Nitride (AlN). The photonic integrated chip 302 is mounted and bonded by thermal-conductive materials on a ceramic submount 304. As AlN is a good thermal conductor, the heat generated from the photonic integrated chip 302 is conducted into the heatsink (shown later in FIG. 4) and a thermoelectric cooler (TEC) 306 that are placed beneath the photonic integrated chip 302. The ceramic submount 304 includes bonding pads for an on-submount thermistor 308 and wire-bonding pads to facilitate electrical connections to a printed circuit board (PCB) (shown later in FIG. 4) and chassis-leads (shown later in FIG. 4). The TEC 306 works by Peltier effect that draws thermal energy from the photonic integrated chip 302 to maintain temperature stability with respect to the set-temperature of the TRX-PIC module 202. The thermistor 308 is a temperature sensor that provides temperature signal to a micro-controller (not shown) which controls the TEC 306.

The PCB may include 3 independent channels of PINFET amplifier circuit which uses transimpedance amplifier chip. Thus, a first transimpedance amplifier chip TIA1 is associated with the first channel CHL The first transimpedance amplifier chip TIA1 is configured to convert photocurrent received from the first light detector DT1 into a voltage signal for signal processing. Similarly, a second transimpedance amplifier chip TIA2 is associated with the second channel CH1, and a third transimpedance amplifier chip TIA3 is associated with the third channel CH3. The second transimpedance amplifier chip TIA2 and the third transimpedance amplifier chip TIA3 is structurally and functionally similar to the first transimpedance amplifier chip TIA1.

The ceramic submount 304 includes a V-groove in the glass-block 310 for fiber-alignment and mounting on the PCB. The V-groove in the glass block 310 enables precise placement of the optical fiber to an accuracy of ±1 micrometer (μm) to facilitate the coupling of the optical fiber to an output of the photonic integrated chip 302. The first PMF pigtail FPG1 is a single-mode optical fiber in which linearly polarized light, when launched into the fiber, maintains a linear polarization during light propagation through the fiber. The first PMF pigtail FPG1 is associated with the first channel CH1. Further, the second PMF pigtail FPG2 is associated with the second channel CH2, and the third PMF pigtail FPG3 is associated with the third channel CH3. The hermetic package 314 is a 16-PIN Kovar/Copper Tungsten (CuW) package that provides a mechanically robust packaging and a hermetic-sealing for the components of the TRX-PIC module 202.

Figure 4:
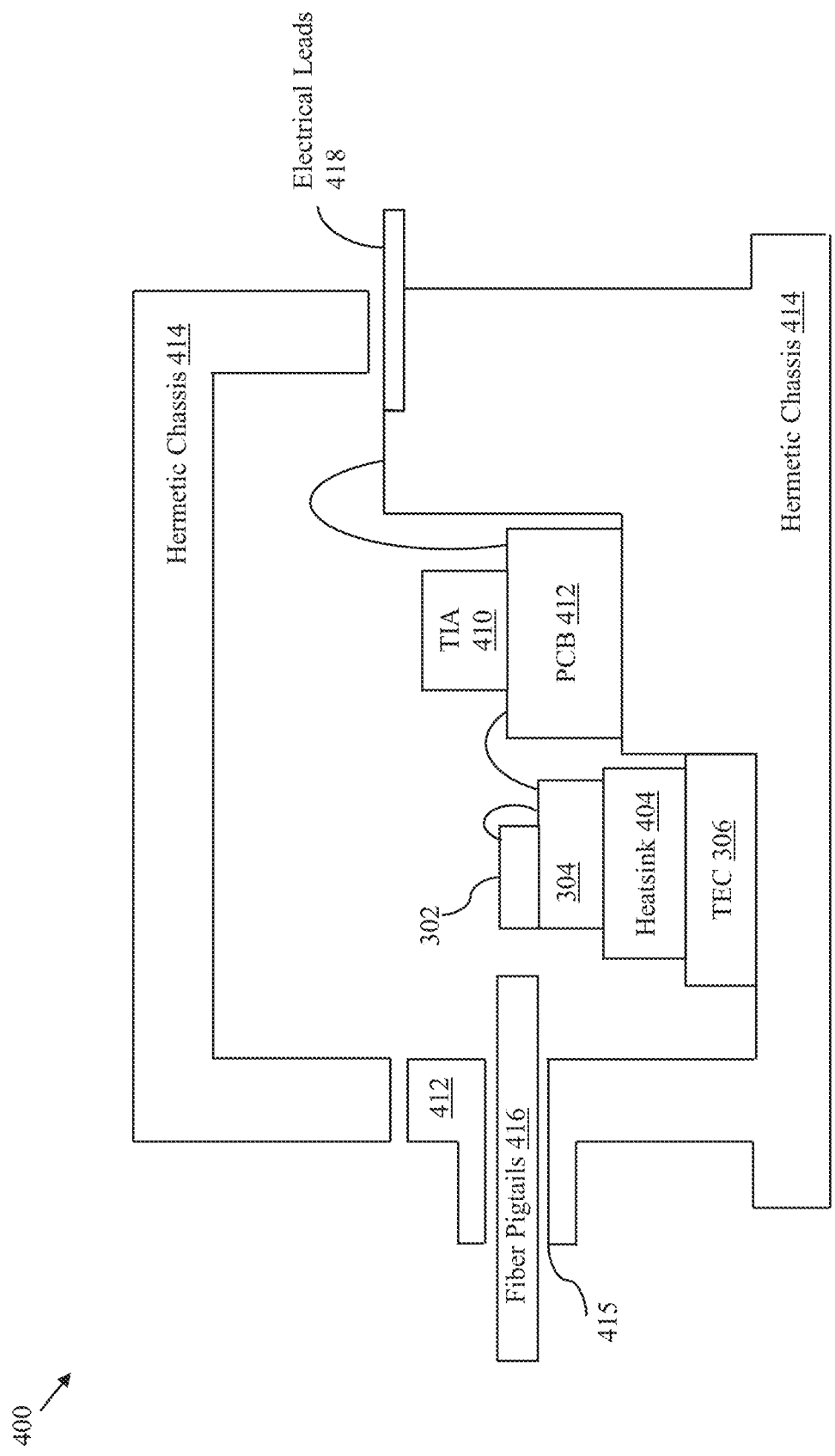
FIG. 4 is a schematic diagram that illustrates a cross-sectional view of the TRX-PIC module, in accordance with an exemplary embodiment of the present disclosure.

FIG. 4 is a schematic diagram that illustrates a cross-sectional view 400 of the TRX-PIC module 202, in accordance with an exemplary embodiment of the present disclosure. The TRX-PIC module 202 includes the photonic integrated chip 302, the ceramic submount 304, a heatsink 404, the TEC 306, the TIA 410 (that includes the first transimpedance amplifier chip TIA1, the second transimpedance amplifier chip TIA2, and the third transimpedance amplifier chip TIA3), and a PCB 412 all packaged into a hermetic chassis 414.

The hermetic chassis 414 may include electrical feed-through (for typically 16-20 leads), a fiber-feedthrough 415 for inserting fiber pigtails 416, and a thermally-conductive mounting base that may serve as a main heat dissipation passage for the photonic integrated chip 302 and the PCB 412. The fiber-feedthrough 415 allows the connection of the optical fiber between component(s) inside the hermetic chassis 414 and the external environment. The fiber pigtails 416 include the first PMF pigtail FPG1, the second PMF pigtail FPG2, and the third PMF pigtail FPG3. The fiber pigtail 416 is thus an output of the three PMF fibers (such as the first PMF pigtail FPG1, the second PMF pigtail FPG2, and the third PMF pigtail FPG3) that are to be connected to the external environment. The hermetic chassis 414 is a sub-component of the Hermetic 16-PIN Kovar/CuW package 314.

Electrical leads 418 are a sub-component of the Hermetic 16-PIN Kovar/CuW package 314. The electrical leads 418 allow electrical connection between components of the TRX-PIC module 202 and the external environment, i.e., external circuitry.

The PCB 412 serves as a substrate for placement and electrical circuit connections of the TIA 410, SLED drivers (not shown), circuitry for signal processing, i.e., the signal processor 216, microcontroller for the TEC 306, and the electrical power supply (not shown).

The heatsink 404 is a thermally conductive metallic heat spreader that spreads out the heat generated from the TRX-PIC module 202 into the TEC 306 so that heat is transferred into the hermetic chassis 414 and the external environment. The electrical leads 418 are connected to the PCB 412 by way of wire bonding. Further, the PCB 412 is coupled to the ceramic submount 304 by way of wire bonding, and the photonic integrated chip 302 is wire bonded to the ceramic submount 304.

Figure 5:
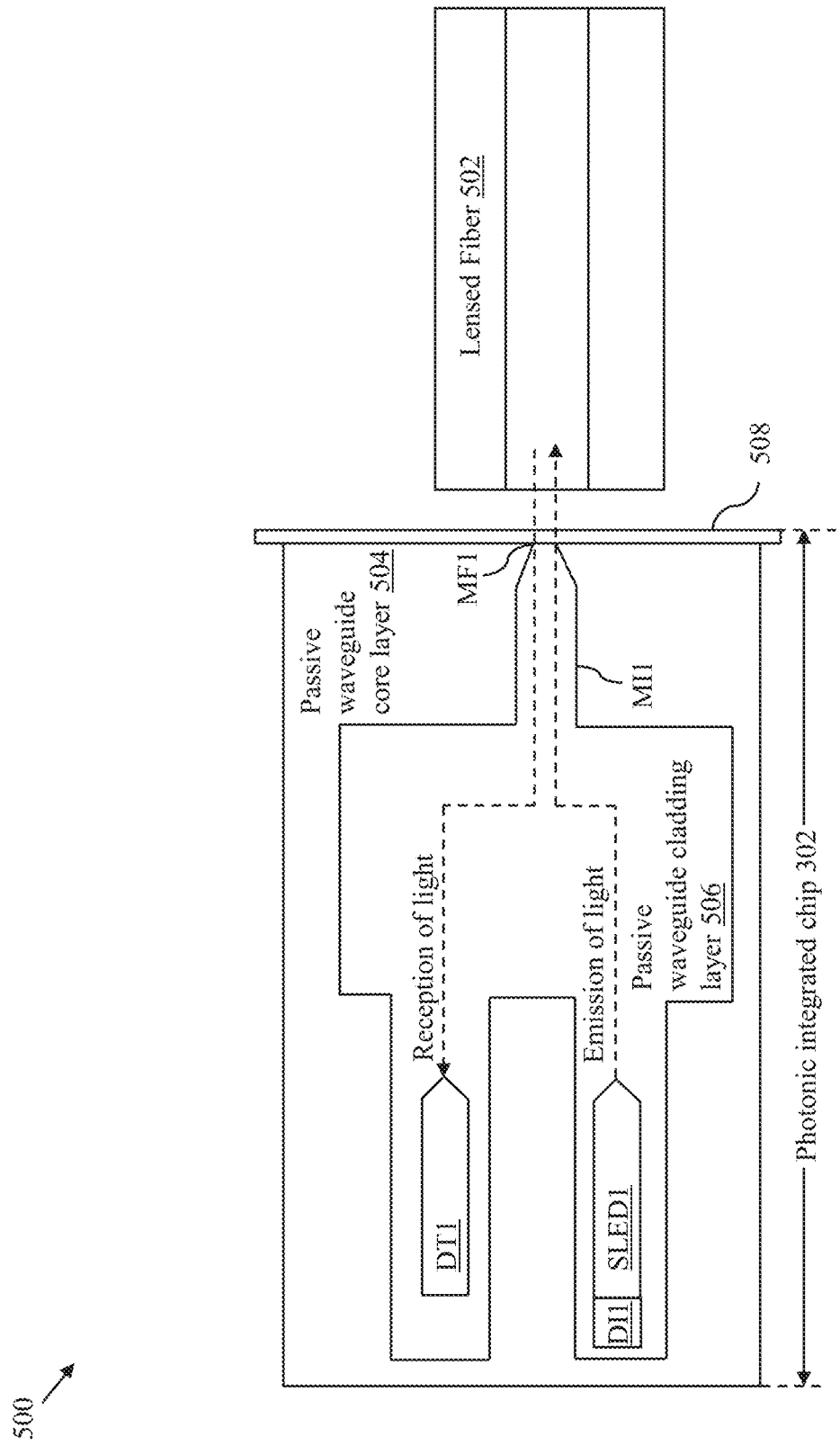
FIG. 5 is a schematic diagram that illustrates a top view of a single channel of a photonic integrated chip of the TRX-PIC module of FIG. 3 coupled with a lensed fiber, in accordance with an exemplary embodiment of the present disclosure.

FIG. 5 is a schematic diagram that illustrates a top view 500 of a single channel (such as the first channel CH1) of the photonic integrated chip 302 coupled with a lensed fiber 502, in accordance with an exemplary embodiment of the present disclosure. The photonic integrated chip 302 is epitaxially grown and employs multiple optical cores to integrate various photonic components on the same chip platform. The first channel CH1 of the photonic integrated chip 302 includes the first light emitter SLED1, the first light detector DT1, the first multimode interference coupler MI1, the first monitor photodiode DI1, and the first mode-field adapter MF1.

The photonic integrated chip 302 is formed from a plurality of layers that include a passive waveguide core layer 504 and a passive waveguide cladding layer 506. The passive waveguide cladding layer 506 is formed on the passive waveguide core layer 504. The first light emitter SLED1 is formed above a first waveguide path of the passive waveguide cladding layer 506. Further, the first light detector DT1 is formed above a second waveguide path of the passive waveguide cladding layer 506. The passive waveguide cladding layer 506 is tapered at an end to form the first mode-field adapter MF1. Alternatively stated, an output end of a third waveguide path of the passive waveguide cladding layer 506 is tapered to form the first mode-field adapter MF1. Further, the first mode-filed adapter MFA1 is coupled with an optical fiber such as the lensed fiber 502.

The first light emitter SLED1 and the first light detector DT1 are formed above the first multimode interference coupler MI1, and the first mode-field adapter MF1 is formed adjacent to the first multimode interference coupler MI1. The first multimode interference coupler MI1 couples the first light emitter SLED1 and the first light detector DT1 to the first mode-field adapter MF1. The first light emitter SLED1 is coupled to the first multimode interference coupler MI1 at a front facet of the first light emitter SLED1. Further, a back facet of the first light emitter SLED1 is coupled with the first monitor photodiode DI1. The photonic integrated chip 302 is configured as a transmitter-receiver chip. A first end of the photonic integrated chip 302 is coated with an anti-reflection coating 508.

To transmit light from the photonic integrated chip 302, the first light emitter SLED1 is configured to emit light based on a forward bias potential difference applied across the first light emitter SLED1. The emitted light is propagated from the first light emitter SLED1 to the mode-field adapter MF1. The emitted light is further propagated from the mode-field adapter MF1 to the lensed fiber 502. The first mode-field adapter MF1 is down-tapered at an output end to a width of approximately ~2 um. Further, an output end of the first mode-field adapter MF1 matches the output end of the photonic integrated chip 302. The output end of the first mode-field adapter MF1 is designed to give round shape to the optical mode, i.e., the emitted light or received light, with typical far-field of 13° (Horizontal)×14.7° (Vertical), for suitable coupling with the lensed fiber 502.

To receive light by the photonic integrated chip 302, the first mode-field adapter MF1 receives light from the lensed fiber 502. The received light by the first mode-field adapter MF1 is propagated from the first mode-field adapter MF1 to the first light detector DT1 by way of the first multimode interference coupler MI1. Based on the reception of the received light by the first mode-field adapter MF1, the first light detector DT1 is configured to detect the received light and generate a photocurrent based on the received light. The first light detector DT1 is reverse biased to detect the received light. Thus, the first mode-field adapter MF1 is configured to at least one of transmit light to the lensed fiber 502 based on the emitted light by the first light emitter SLED1, and receive light from the lensed fiber 502.

For any back propagating light emitted from the first light emitter SLED1, as the first light emitter SLED1 is operated in the low emission power mode, thus the first light emitter SLED1 is less sensitive to optical feedback due to lower optical gain in the first light emitter SLED1. The operating power of the photonic integrated chip 302 is 1-5 milli Watts (mW).

Figure 6:
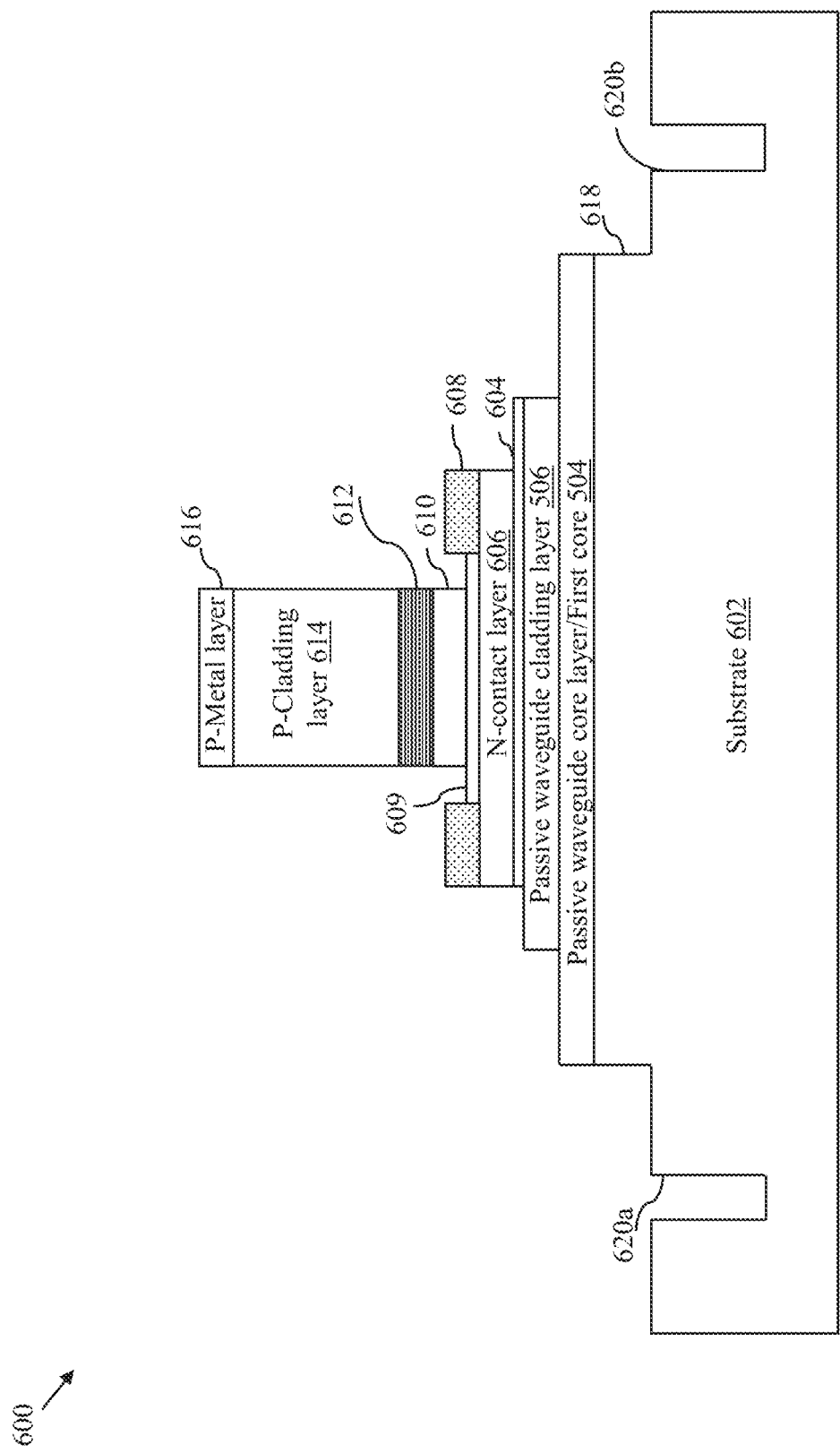
FIG. 6 is a cross-sectional view of the plurality of layers of the photonic integrated chip of FIG. 5 in accordance with an exemplary embodiment of the present disclosure.

FIG. 6 is a cross-sectional view 600 of the plurality of layers of the photonic integrated chip 302, in accordance with an exemplary embodiment of the present disclosure. The plurality of layers are formed on a substrate 602. In one embodiment, the substrate 602 is formed from Indium Phosphide (InP). In various embodiments, the substrate 602 may be formed from InP, GaAs, silicon, silica-on-silicon, silica, silica-on-polymer, glass, a metal, a ceramic, a polymer, or a combination thereof.

The plurality of layers comprise the passive waveguide core layer 504, the passive waveguide cladding layer 506, a first etch stop layer 604, an N-contact layer 606, a second etch stop layer 609, an N-cladding layer 610, an active layer 612, a P-cladding layer 614, and a P-metal layer 616. The plurality of layers are divided into a first plurality of layers and a second plurality of layers. The first plurality of layers comprise the first etch stop layer 604, the N-contact layer 606, and the second etch stop layer 609. The second plurality of layers comprise the N-cladding layer 610, the active layer 612, and the P-cladding layer 614. Each layer of the plurality of layers is grown by depositing a suitable material on top of a corresponding layer to form a layer structure of the photonic integrated chip 302. In one embodiment, each layer is grown using metal-organic chemical vapor deposition (MOCVD). In various embodiments, suitable film deposition techniques that include physical vapor deposition (PVD) such as thermal evaporation, electron beam evaporation, and sputter deposition, other CVD techniques such as laser CVD and plasma-enhanced CVD, and atomic layer deposition (ALD) may be utilized. Once all the layers are grown to obtain the layer structure of the photonic integrated chip 302, the second plurality of layers are patterned by etching to form the first light emitter SLED1, the first light detector DT1, the first monitor photodiode D1. Further, the first plurality of layers are further patterned by etching the first plurality of layers. The active layer 612 includes a stack of quantum wells. Each adjacent quantum well of the stack of quantum wells is separated by a corresponding barrier layer.

The passive waveguide core layer 504 is formed above the substrate 602. In one embodiment, the passive waveguide core layer 504 is formed on the substrate 602. The passive waveguide core layer 504 is grown by depositing InGaAsP on the substrate 602. The passive waveguide core layer 504 is configured as a first core 504. The first core 504 is lattice-matched with the substrate 602. Further, the first core 504 is undoped.

The passive waveguide cladding layer 506 is grown on the passive waveguide core layer 504. The passive waveguide cladding layer 506 is grown by depositing InP on the passive waveguide core layer 504. Further, the first etch stop layer 604 is grown on the passive waveguide cladding layer 506. The first etch stop layer 604 may be undoped and is grown by depositing InGaAsP on the passive waveguide cladding layer 506. The n-contact layer 606 is grown on the first etch stop layer 604. The n-contact layer 606 is grown by depositing InP on the first etch stop layer 604. The second etch stop layer 609 is grown on the n-contact layer 606. The second etch stop layer 609 is grown by depositing InGaAsP on the n-contact layer 606.

The n-cladding layer 610 is grown on the second etch stop layer 609. The n-cladding layer 610 is grown by depositing InP on the second etch stop layer 609. The active layer 612 is grown on the n-cladding layer 610. The active layer 612 is grown by depositing InGaAsP quantum wells and barrier layers of varying compositions. The P-cladding layer 614 is grown on the active layer 612. The P-cladding layer 614 is grown by depositing InP on the active layer 612. Further, the P-metal layer 616 is grown on the P-cladding layer 614. The P-metal layer 616 may be grown by depositing one of gold, chromium, aluminum, silver, platinum, nickel, copper, rhodium, palladium, tungsten, and combinations of such materials.

The second plurality of layers are patterned to form at least one of the first light emitter SLED1, the first monitor photodiode DI1, and the first light detector DT1. The P-cladding layer 614, the active layer 612, and the N-cladding layer 610 may be patterned by etching each of the P-cladding layer 614, the active layer 612, and the N-cladding layer 610, respectively, up to the second etch stop layer 609. An etching process such as wet etching, plasma etching that includes but is not limited to reactive ion etching and deep reactive ion etching, sputter etching, or a combination thereof may be used for patterning the second plurality of layers.

The patterned P-cladding layer 614, the patterned active layer 612, and the patterned N-cladding layer 610 form at least one of the first light emitter SLED1, the first monitor photodiode DI1, and the first light detector DT1. Further, the active layer 612 is configured as a second core 612. The second core 612 has a lower bandgap as compared to the first core 504. The passive waveguide cladding layer 506 is patterned to form the first waveguide path, the second waveguide path, and the third waveguide path. An end of the third waveguide path of the passive waveguide cladding layer 506 is patterned to form the first mode-field adapter MFA1. The patterned P-cladding layer 614, the patterned active layer 612, and the patterned N-cladding layer 610 formed above the first waveguide path represent the first light emitter SLED1. Further, the patterned P-cladding layer 614, the patterned active layer 612, and the patterned N-cladding layer 610 formed above the second waveguide path represent the first light detector DT1. In addition, the patterned P-cladding layer 614, the patterned active layer 612, and the patterned N-cladding layer 610 formed adjacent to the first light emitter SLED1 represent the first monitor photodiode DI1. Thus, the layers of the first monitor photodiode DI1 are the same as the layers of the first light emitter SLED1.

The first plurality of layers, i.e., the first etch stop layer 609, the N-contact layer 606, and the second etch stop layer 609 are patterned after the second plurality of layers are patterned. Further, the first plurality of layers are similarly patterned by etching as the patterning of the second plurality of layers.

An isolation mesa 618 is formed between the first light emitter SLED1 and the first light detector DT1. In addition, deep isolation trenches 620a and 620b are formed on each side of the first light emitter SLED1 and the first light detector DT1. The P metal layer 616 is deposited on top of the patterned P-cladding layer 614. Further, an N metal layer 608 is formed on each side of the second etch stop layer 609 and on top of the patterned N-contact layer 606. Thus, the N-contact layer 606 (N+InP) is sandwiched between the first core 504 and the second core 612. In an embodiment, the P metal layer 616 and the N metal layer 608 are part of at least one of the first light emitter SLED1, the first monitor photodiode DI1, and the first light detector DT1.

The passive waveguide cladding layer 506 is an InP spacer layer. The light generated in the second core 612 is guided by the P-cladding layer 614 and the N-cladding layer 610. The light is generated based on the application of a suitable potential difference across the P metal layer 616 and the N metal layer 608. The N-cladding layer 610 acts as a spacer between the first core 504 and the second core 612. The first etch stop layer 604 and the second etch stop layer 609 are thin and of the order of 20 nanometers. As the second core 612 is undoped, the second core 612 is unable to absorb light.

In the dual-core approach for the photonic integrated chip 302, to realize the transmit path and the receive path, two optical cores such as the first core 504 and the second core 612 are used. The first core 504 is thus an active optical core layer and the second core 612 is a passive optical core layer. The first core 504 and the second core 612 are common across the entire photonic integrated chip 302. In other words, layers to form the first core 504 and the second core 612 are similar across the transmit-path and the receive path of all 3-channels, i.e., the first channel CH1, the second channel CH2, and the third channel CH3, of the photonic integrated chip 302.

The second core 612 is used to build both the first light emitter SLED1 and the first light detector DT1. The second core 612 is formed from Indium-Gallium-Arsenide-Phosphide (InGaAsP) based multiple quantum wells (MQWs) that are epitaxially grown above the first core 504. The first core 504 is formed from lattice-matched InGaAsP layers of specific refractive indices such that an optical waveguide is implemented for propagating light throughout the photonic integrated chip 302. The first core 504 is lattice-matched to the underlying substrate 602. The first core 504, i.e., the InGaAsP waveguide, is undoped. Further, the InP-based substrate 602 is semi-insulating to minimize optical propagation loss through the photonic integrated chip 302. The first monitor photodetector DI1 is positioned at the back facet of the first light emitter SLED1 to sense an output power level of the first light emitter SLED1. Alternatively stated, the back facet of the first light emitter SLED1 is coupled to the first monitor photodetector DI1. Further, the first monitor photodiode DI1 is reverse biased. In various other embodiments, Aluminum Gallium Indium Arsenide (AlGaInAs) may be used for fabricating the plurality of layers.

Figure 7:
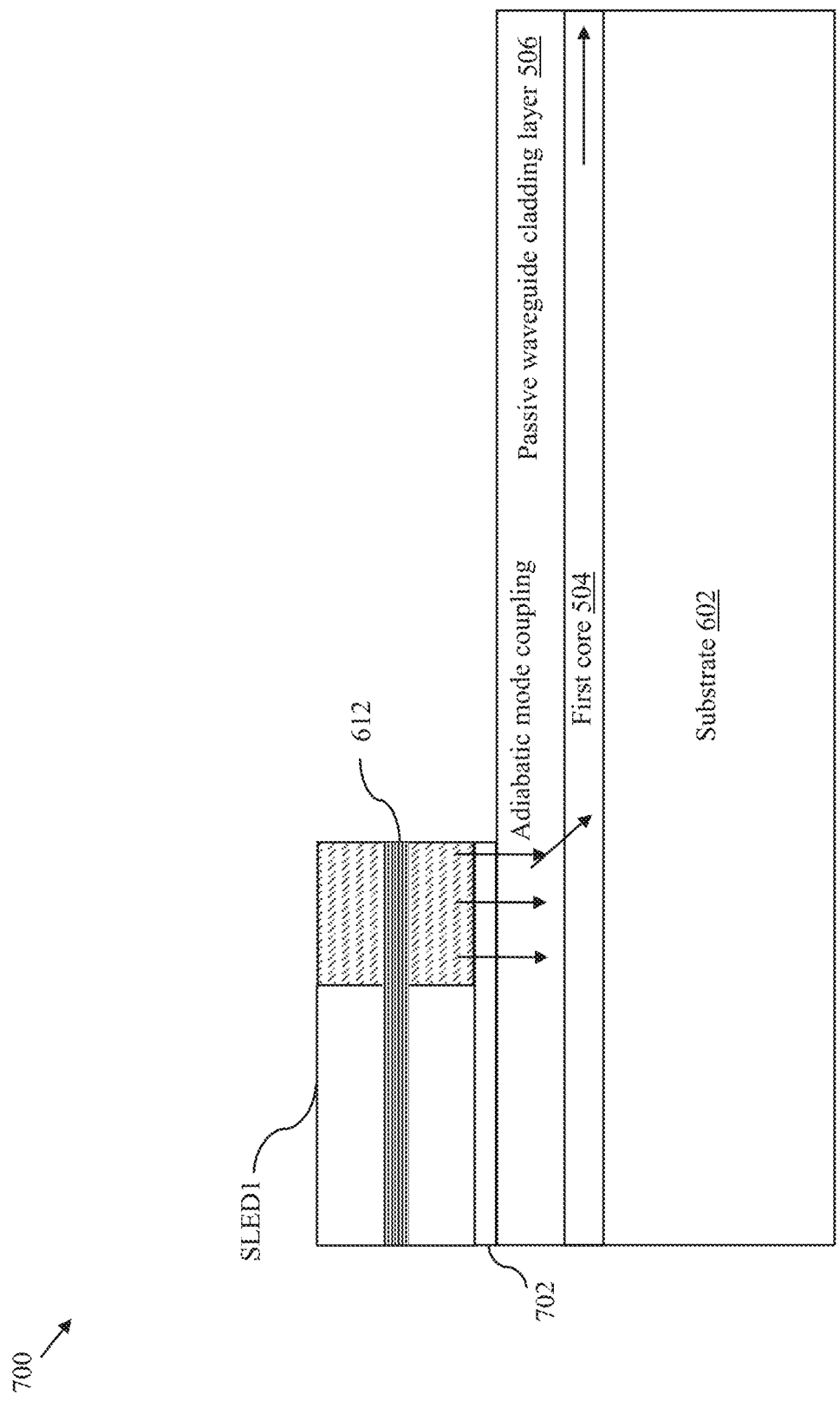
FIG. 7 is a cross-sectional view of a transmit path of light from a first core of a first light emitter to a second core in the photonic integrated chip of FIG. 5, in accordance with an exemplary embodiment of the present disclosure.

FIG. 7 is a cross-sectional view 700 of a transmit path of light from the second core 612 of the first light emitter SLED1 to the first core 504 in the photonic integrated chip 302, in accordance with an exemplary embodiment of the present disclosure.

The active layer 612 functions as the second core 612 of the photonic integrated chip 302. The second core 612 is tapered such that the light propagates from the second core 612 to the first core 504 by way of adiabatic coupling between the second core 612 and the first core 504 that is formed on the substrate 602. In the transmit path, the light emitted by the first light emitter SLED1 is thus guided by adiabatic mode-coupling that is implemented by tapering the second core 612, into the first core 504.

The layers 702 present between the first light emitter SLED1 and the first core 504 represent the patterned second etch stop layer 609, the patterned N-contact layer 606, and the patterned first etch stop layer 604 that are formed above the first waveguide path. The length of the layers 702 is depicted for representational purposes in FIG. 7 and may extend beyond the length of the first light emitter SLED1. The bandgap of the first core 504 is larger than that of the second core 612 such that the light that is guided from the first light emitter SLED1 to the second core 612 by way of the passive waveguide cladding layer 506 may not experience optical absorption.

Figure 8:
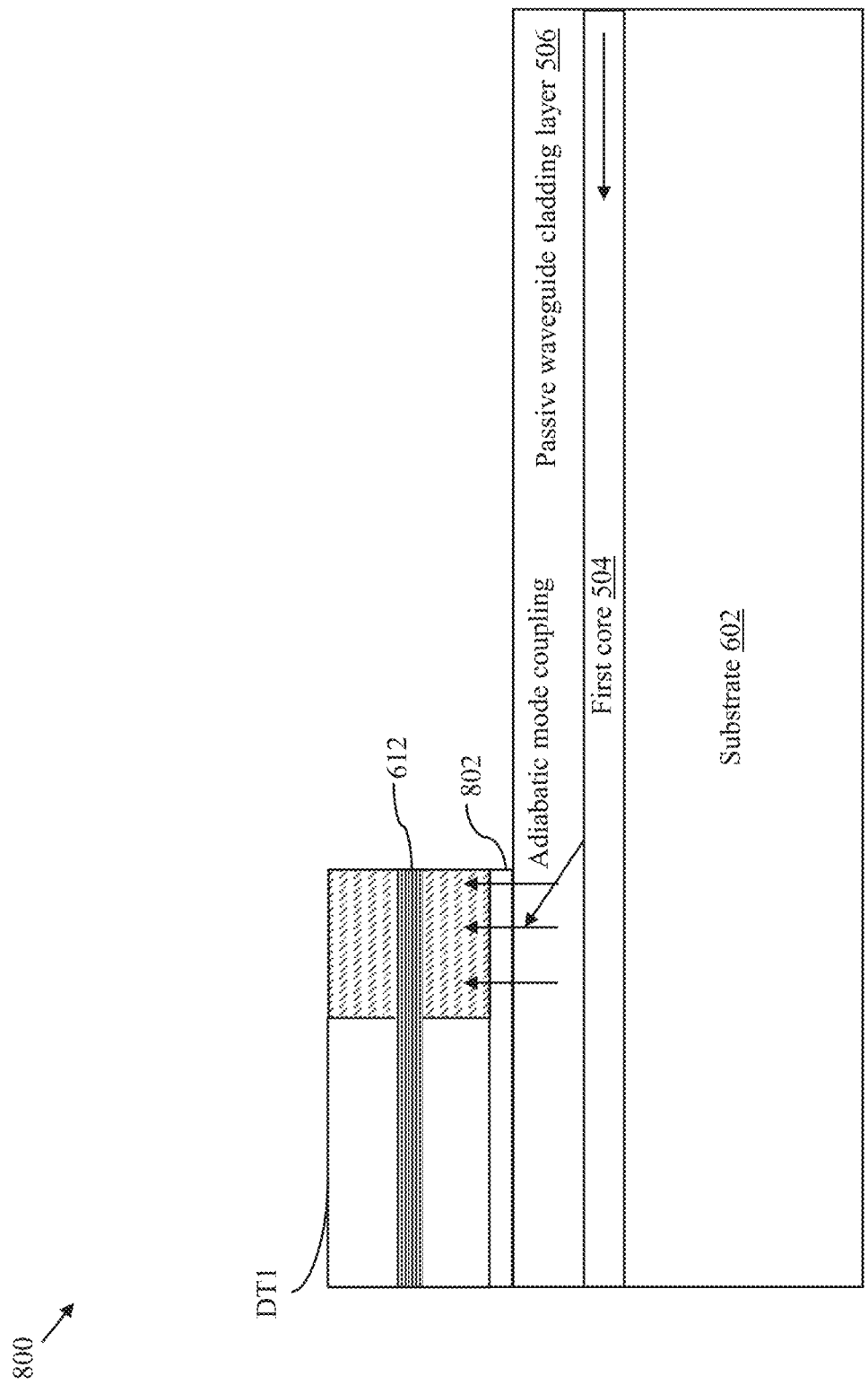
FIG. 8 is a cross-sectional view of a receive path of light from the first core of the light detector to the second core in the photonic integrated chip of FIG. 5, in accordance with another exemplary embodiment of the present disclosure.

FIG. 8 is a cross-sectional view 800 of a receive path of the light from the first core 504 of the first light emitter SLED1 to the second core 612 in the photonic integrated chip 302, in accordance with an exemplary embodiment of the present disclosure. For the receive path, the propagating light in the waveguide of the first core 504 travels in a reverse direction and adiabatically couples into the first core 504 of the first light detector DT1 by way of the passive waveguide cladding layer 506. The layers 802 present between the first light detector DT1 and the first core 504 represent the patterned second etch stop layer 609, the patterned N-contact layer 606, and the patterned first etch stop layer 604 that are formed above the second waveguide path. The length of the layers 802 is depicted for representational purposes in FIG. 8 and may extend beyond the length of the first light detector DT1.

A single epi-growth run is implemented for fabricating both the first core 504 and the second core 612. Further, the light is directed between the first core 504 and the second core 612 by adiabatic coupling. Since there is no need for any re-growth, such as butt-joint or selective area epitaxy (SAE), to create both the active and passive layer cores, i.e., the second core 612 and the first core 504, respectively, the cost of fabricating the photonic integrated chip 302 is lower as compared to the conventional transmit-receive circuitry 102 that require multiple growth runs for manufacturing the active layer core and the passive layer core. Further, the same layers of the active layer (i.e., the second core 612) is used for fabricating both the first light emitter SLED1 for generating light and the first light detector DT1 for detecting light since the bandgap of the light detector DT1 need not be shifted to a smaller value to improve sensitivity due to the broadband nature of light.

Figure 9:
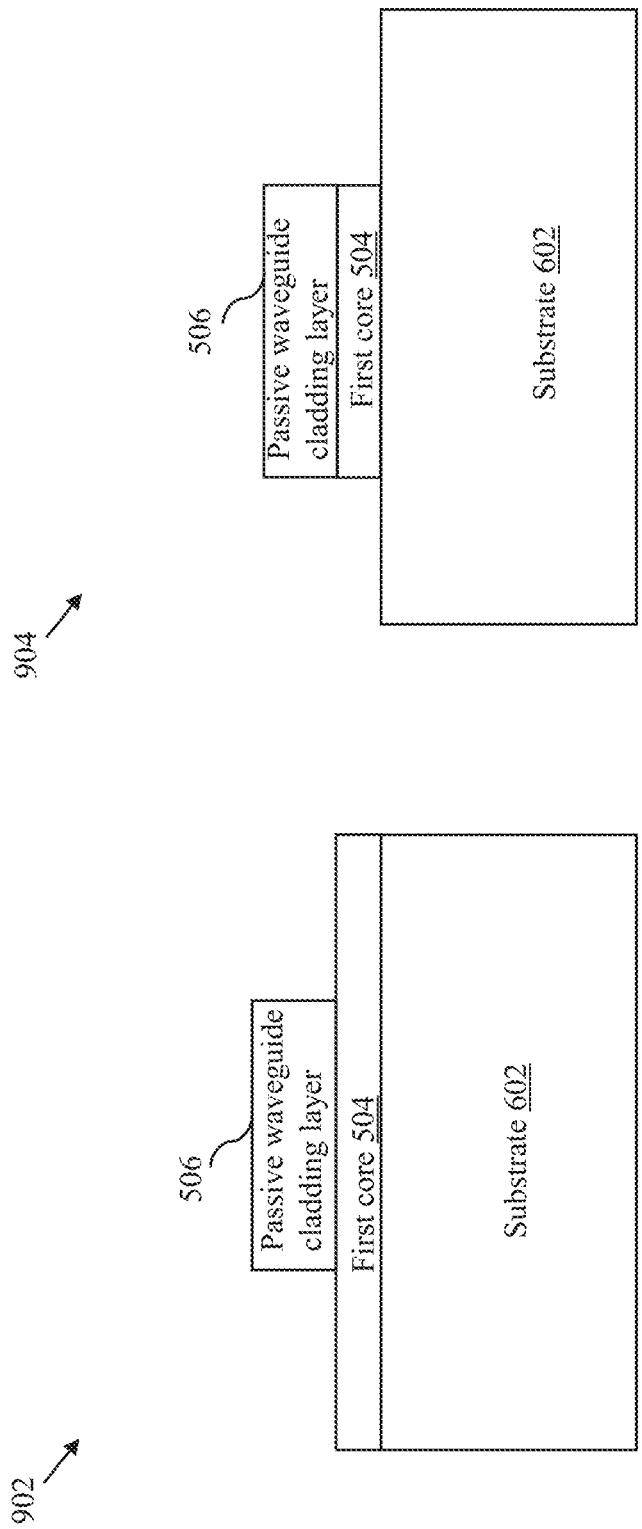
FIG. 9A is a schematic diagram that illustrates a cross-sectional view of the first core below a passive waveguide cladding layer of the plurality of layers of FIG. 6, in accordance with an exemplary embodiment of the present disclosure.
FIG. 9B is a schematic diagram that illustrates a cross-sectional view of the first core below the passive waveguide cladding layer of the plurality of layers of FIG. 6, in accordance with another exemplary embodiment of the present disclosure.

FIG. 9A is a schematic diagram that illustrates a cross-sectional view 902 of the first core 504 below the passive waveguide cladding layer 506, in accordance with an exemplary embodiment of the present disclosure. The passive waveguide cladding layer 506 is patterned such that the passive waveguide cladding layer 506 is etched and formed on a first portion of the first core 504.

FIG. 9B is a schematic diagram that illustrates a cross-sectional view 904 of the first core 504 below the passive waveguide cladding layer 506, in accordance with another exemplary embodiment of the present disclosure. The passive waveguide cladding layer 506 and the first core 504 are patterned such that a length of the passive waveguide cladding layer 506 matches a length of the first core 504.

Figure 10:
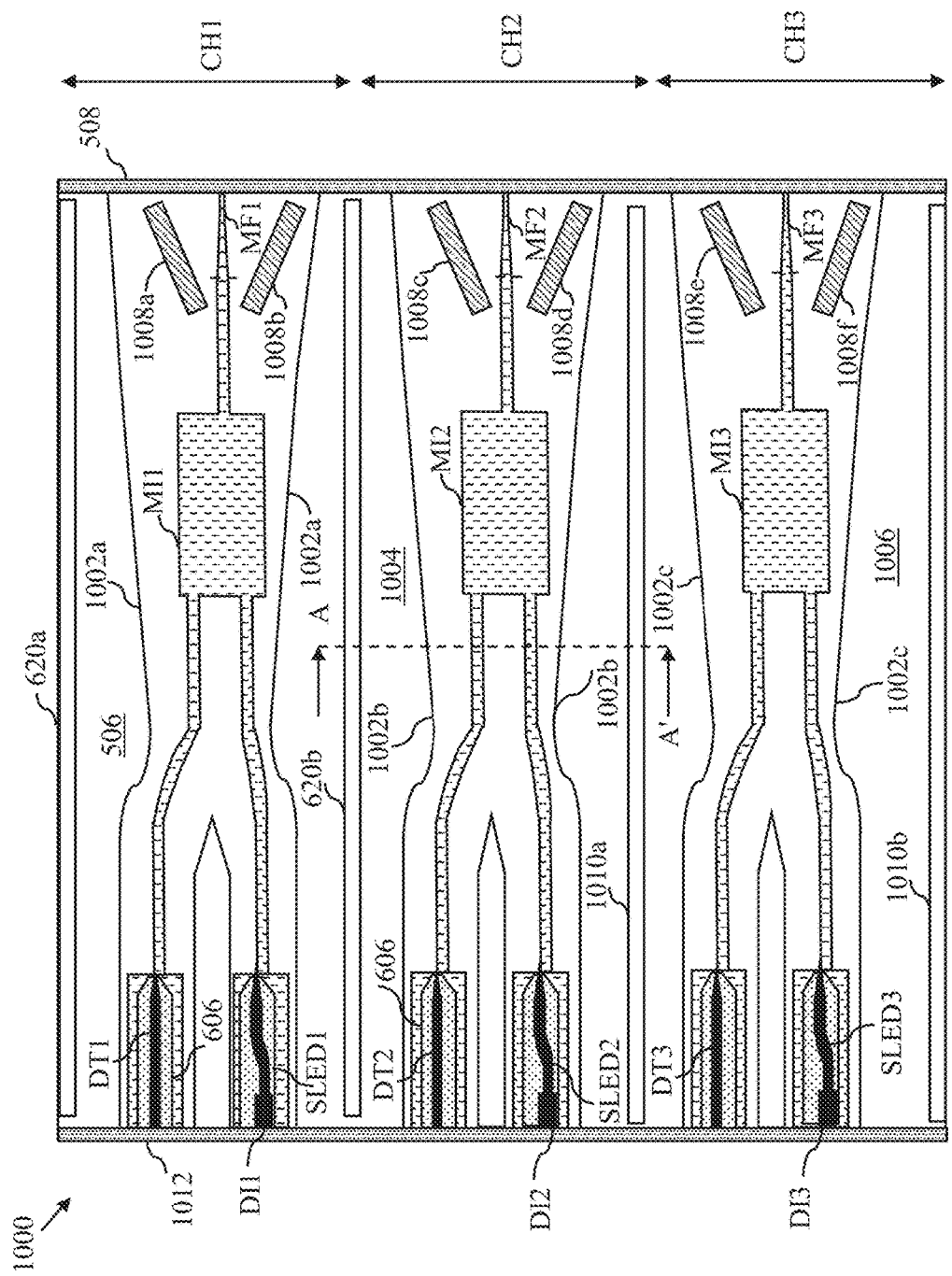
FIG. 10 is a schematic diagram that illustrates a top-view of a layout of the photonic integrated chip of FIG. 5 for optical isolation, in accordance with another exemplary embodiment of the present disclosure.

FIG. 10 is a schematic diagram that illustrates a top-view 1000 of a layout of the photonic integrated chip 302 for optical isolation, in accordance with another exemplary embodiment of the present disclosure.

With reference to the first channel CH1, the first light emitter SLED1, and the first light detector DI1 are confined within a mesa 1002a formed on the passive waveguide cladding layer 506. An isolation trench 1008a and another isolation trench 1008b are formed at an oblique angle near an output end of the first mode-field adapter MF1, i.e., the output facet of the photonic integrated chip 302. Thus, stray light power from the first light emitter SLED1 is confined within the mesa 1004a and cannot cross over the first channel CH1. The first isolation trench 620a and the second isolation trench 620b are etched into the lattice-matched substrate 602 at each transceiver-channel boundary. Thus, the fourth isolation trench 620b is etched between the first channel CH1 and the second channel CH2. The first light emitter SLED1 is S-shaped for high order mode filtering of wavelengths of the emitted light. The side-wall of the mesa 1002a near the vicinity of the first multimode interference coupler MI1 is slanted to direct the DC light due to 3 decibels (dB) insertion loss in the first multimode interference coupler MI1, toward an output end of the photonic integrated chip 302 which is anti-reflection coated 508 to maximize light dissipation out of the photonic integrated chip 302. In addition, a back facet of the first light detector DT1 and a back facet of the first monitor photodiode DI1 are coated with the anti-reflection coating 1012.

With reference to the second channel CH2, the second channel CH2 depicts the mesa 1002b formed on a second passive waveguide cladding layer 1004 to confine the light detector DT2 and the light emitter SLED2. Isolation trenches 1008c and 1008d are formed at an oblique angle near the output facet of the photonic integrated chip 302 to reflect the back-traveling light due to facet reflections. An isolation trench 1010a is formed between the first channel CH1 and the second channel CH2. Similarly, with reference to the third channel CH3, the third channel CH3 depicts the mesa 1002c formed on a third passive waveguide cladding layer 1006 to confine the light detector DT3 and the light emitter SLED3. Isolation trenches 1008e and 1008f are formed at an oblique angle near the output facet of the photonic integrated chip 302 to reflect the back-traveling light due to facet reflections. Further, another isolation trench 1010b is formed at another end of the third channel CH3.

Figure 11:
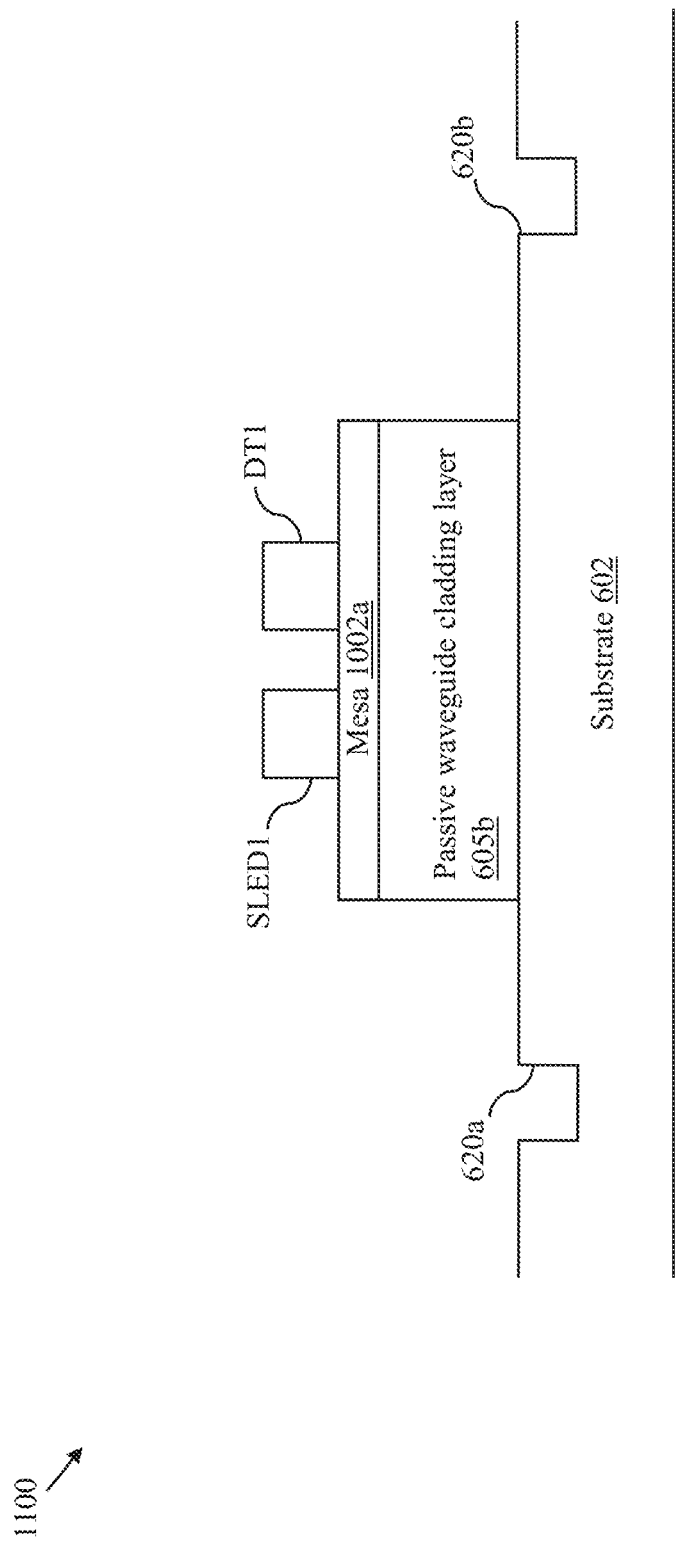
FIG. 11 is a schematic diagram that illustrates a sectional-view across axis A-A' of the layout of the photonic integrated chip of FIG. 10, in accordance with another exemplary embodiment of the present disclosure.

FIG. 11 is a schematic diagram that illustrates a sectional-view 1100 across axis A-A' of the layout of the photonic integrated chip 302 of FIG. 10 for optical isolation, in accordance with another exemplary embodiment of the present disclosure. The sectional view A-A' depicts the first light emitter SLED1 and the first light detector DT1 formed on the mesa 1002a. An isolation trench is formed at a first side of the first light emitter SLED1 and another isolation trench is formed at a second side of the first light detector DT1. Thus, FIG. 11 further depicts the third isolation trench 620a formed at the first side of the first light emitter SLED1 and the fourth isolation trench 620b formed at the second side of the first light detector DT1.

Figure 12:
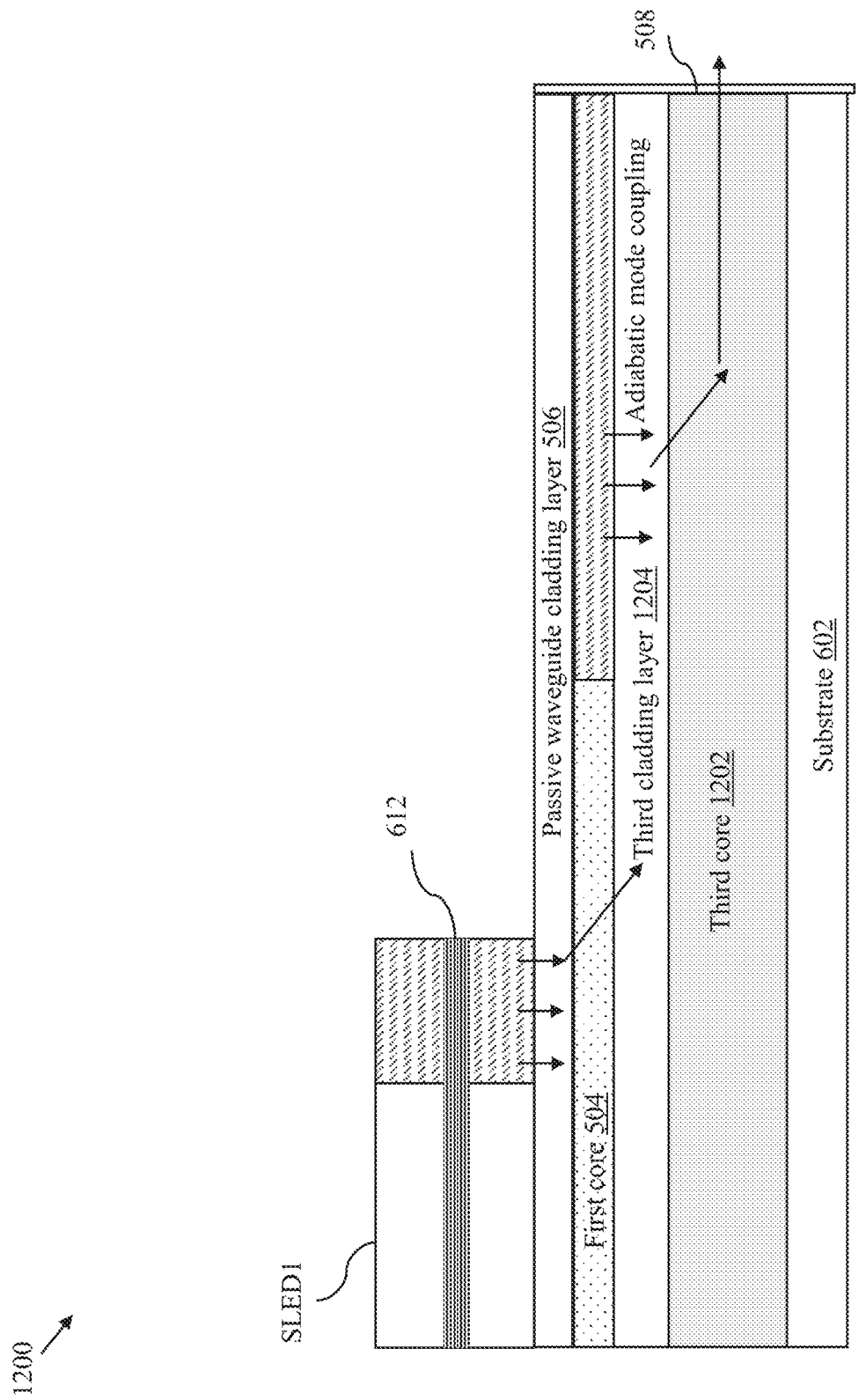
FIG. 12 is a schematic diagram that illustrates a cross-sectional view of the photonic integrated chip employing three optical cores, in accordance with another exemplary embodiment of the present disclosure.

FIG. 12 is a schematic diagram that illustrates a cross-sectional view 1200 of the photonic integrated chip 302 employing three optical cores, in accordance with another exemplary embodiment of the present disclosure.

In the main embodiment of the present disclosure, the dual-core approach as depicted in FIG. 7 and FIG. 8 is described to realize the photonic integrated chip 302. In the dual-core approach, the first mode-field adapter MFA1 employs the embedded passive-layer optical core (i.e., the first core 504) for guiding the light in the photonic integrated chip 302 and the output through the mode-field adapter MFA1 to the lensed fiber 502. In the dual-core approach, the customed lensed fiber 502 is needed to minimize the coupling loss to the photonic integrated chip 302. In addition, active fiber alignment may be needed during optical component assembly of the lensed fiber 502.

As an alternative to the dual-core approach, a tri-core approach of FIG. 12 may be employed to realize the photonic integrated chip 302. In this case, an optical core (i.e., a third core 1202) that includes multiple pairs of alternating InP/InGaAsP with thin InGaAsP layer and thick InP layer per pair is used to form a dilute waveguide. A thickness of each of the thin InGaAsP layer is 30-40 nanometres (nm), and a thickness of each of the thick InP-layer is 500-550 nm.

A third cladding layer 1204 is formed above the third core 1202. The passive waveguide core layer 504, i.e., the first core 504, is formed above the third cladding layer 1204. An end of the third core 1202 and the third cladding layer 1204 is coated with the anti-reflection coating 508.

The third core 1202 is formed on the substrate 602. The third core 1202 has a lower refractive index with respect to the substrate 602. The first core 504 continues to maintain the function for guiding the light on the photonic integrated chip 302. At the output of the photonic integrated chip 302, light in the first core 504 is coupled into the third core 1202 through adiabatic coupling in the form of a taper. Thus, the first core 504 is tapered such that at least one of (i) the emitted light propagates from the first core 504 to the third core 1202 and (ii) the received light propagates from the third core 1202 to the first core 504.

The third core 1202 functions as a spot-size converter (SSC). By the dilute nature of the third core 1202, the effective index of the third core 1202 has a least refractive index contrast with the substrate 602 and the output optical mode has a low divergence that is suitable for coupling to as-cleaved single-mode fiber (SMF) (not shown). The dilute waveguide, i.e., the third core 1202, has a good coupling efficiency to the as-cleaved SMF as the dilute waveguide allows passive alignment with the SMF. This facilitates the placement of the SMF on the V-groove glass block 310 on the photonic integrated chip 302, thereby reducing the assembly cost of the TRX-PIC module 202.

Figure 13A:
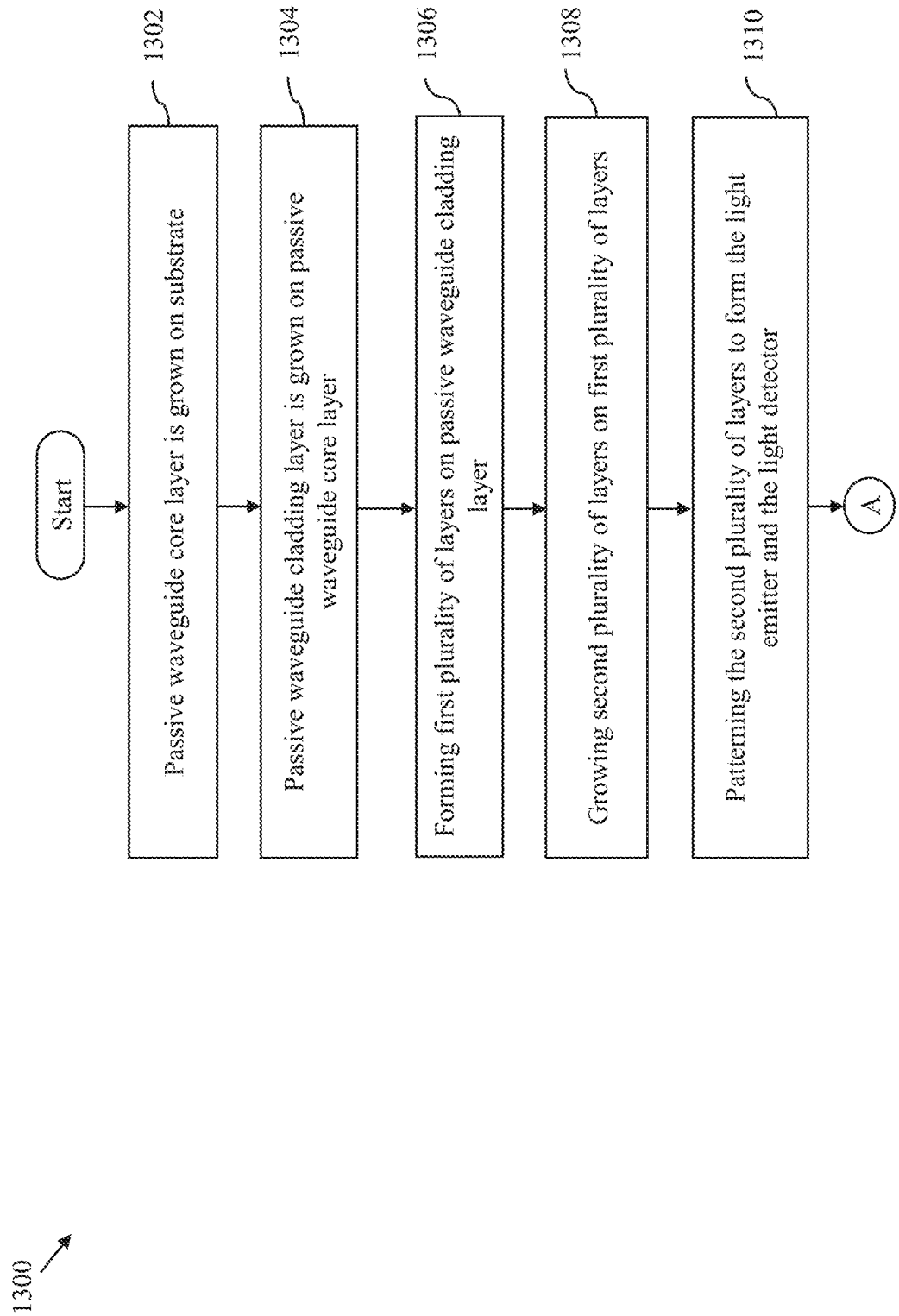
FIGS. 13A and 13B represent a flowchart for fabricating a layer structure of the plurality of layers of FIG. 6 in accordance with an embodiment of the present disclosure.
Figure 13B:
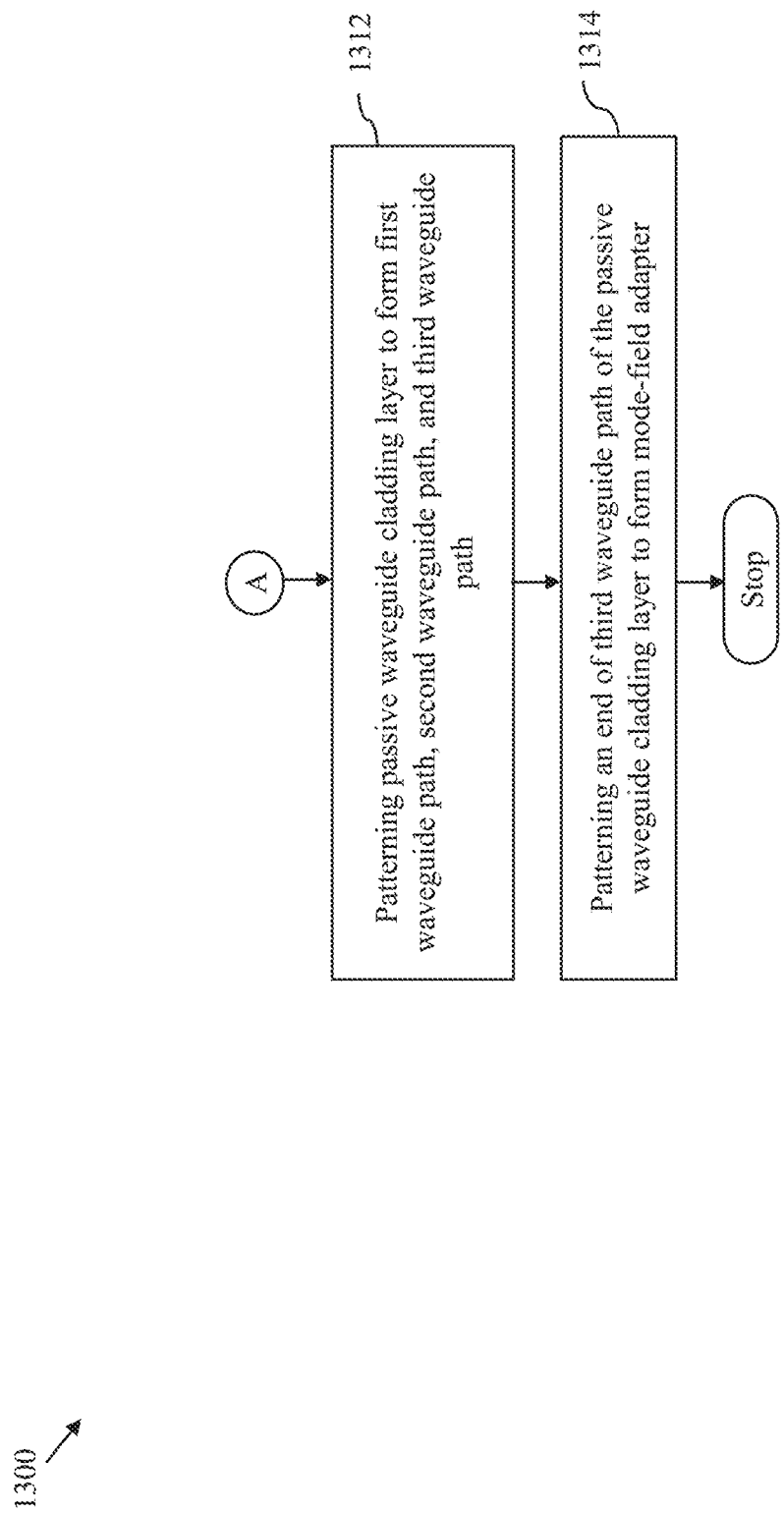

FIGS. 13A and 13B represent a flowchart 1300 for fabricating the layer structure of the photonic integrated chip 302 in accordance with an embodiment of the present disclosure. At 1302, the passive waveguide core layer 504 is grown on the substrate 602. At 1304, the passive waveguide cladding layer 506 is grown on the passive waveguide core layer 504. At 1306, the second plurality of layers are formed on the passive waveguide cladding layer 506. At 1308, the second plurality of layers are grown on the first plurality of layers. At 1310, the second plurality of layers are patterned to form the first light emitter SLED1 and the first light detector DT1. At 1312, the passive waveguide cladding layer 506 is patterned to form the first waveguide path, the second waveguide path, and the third waveguide path. At 1314, an end of the third waveguide path of the passive waveguide cladding layer 506 is patterned to form the first mode-field adapter MF1.

Figure 14:
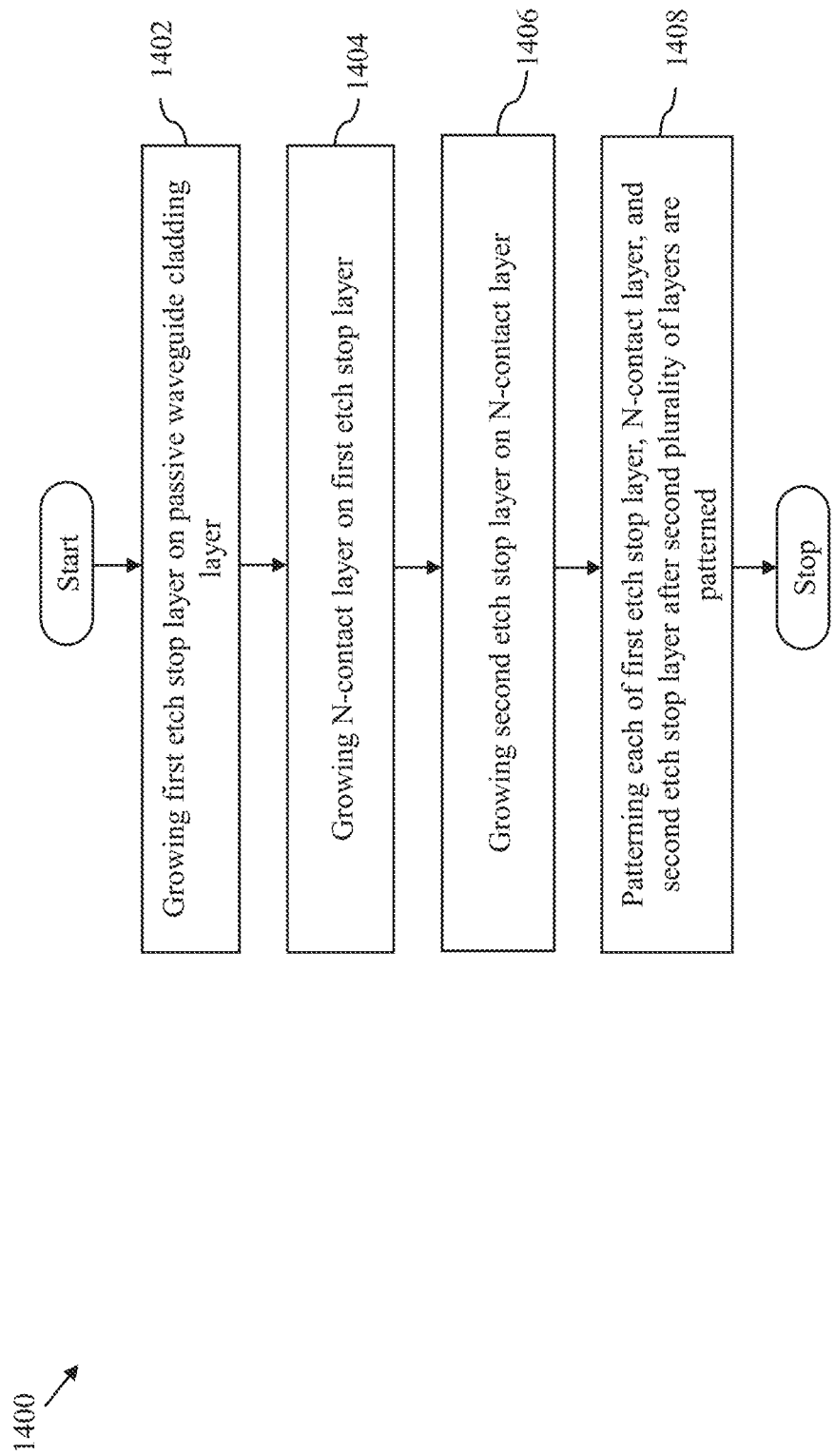
FIG. 14 represents a flowchart for forming a first plurality of layers of the plurality of layers of FIG. 6 in accordance with an embodiment of the present disclosure.

FIG. 14 represents a flowchart 1400 for forming the first plurality of layers on the passive waveguide cladding layer 506 in accordance with an embodiment of the present disclosure. At 1402, the first etch stop layer is grown on the passive waveguide cladding layer 506. At 1404, the N-contact layer 606 is grown on the first etch stop layer 604. At 1406, the second etch stop layer 609 is grown on the N-contact layer 606. At 1408, each of the first etch stop layer 604, the N-contact layer 606, and the second etch stop layer 609 are patterned by etching each of the first etch stop layer 604, the N-contact layer 606, and the second etch stop layer 609, respectively, after the second plurality of layers are patterned.

Figure 15:
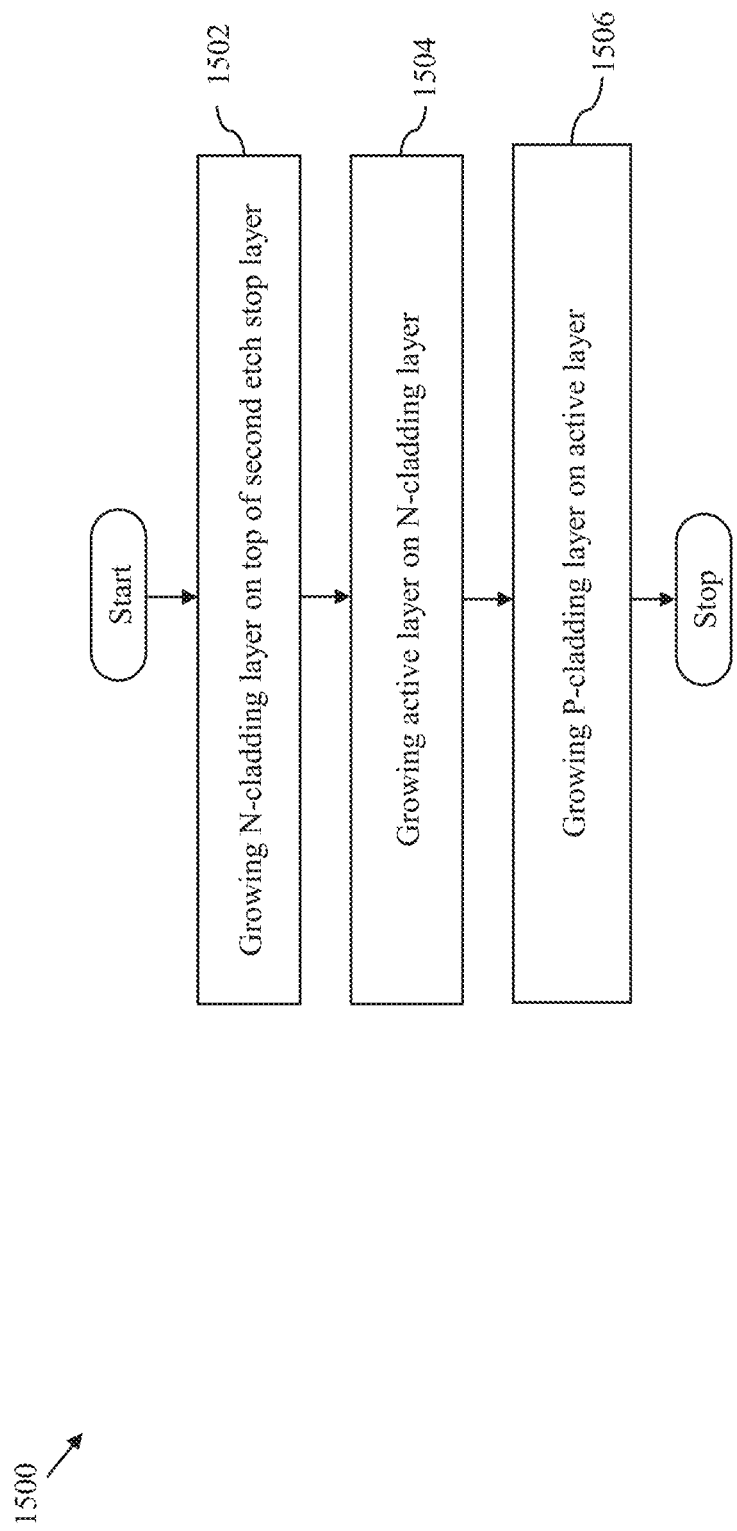
FIG. 15 represents a flowchart for growing a second plurality of layers of the plurality of layers of FIG. 6 in accordance with an embodiment of the present disclosure.

FIG. 15 represents a flowchart 1500 for growing the second plurality of layers on the first plurality of layers in accordance with an embodiment of the present disclosure. At 1502, the N-cladding layer 610 is grown on top of the second etch stop layer 609. At 1504, the active layer 612 is grown on the N-cladding layer 610. At 1506, the P-cladding layer 614 is grown on the active layer 612.

Figure 16:
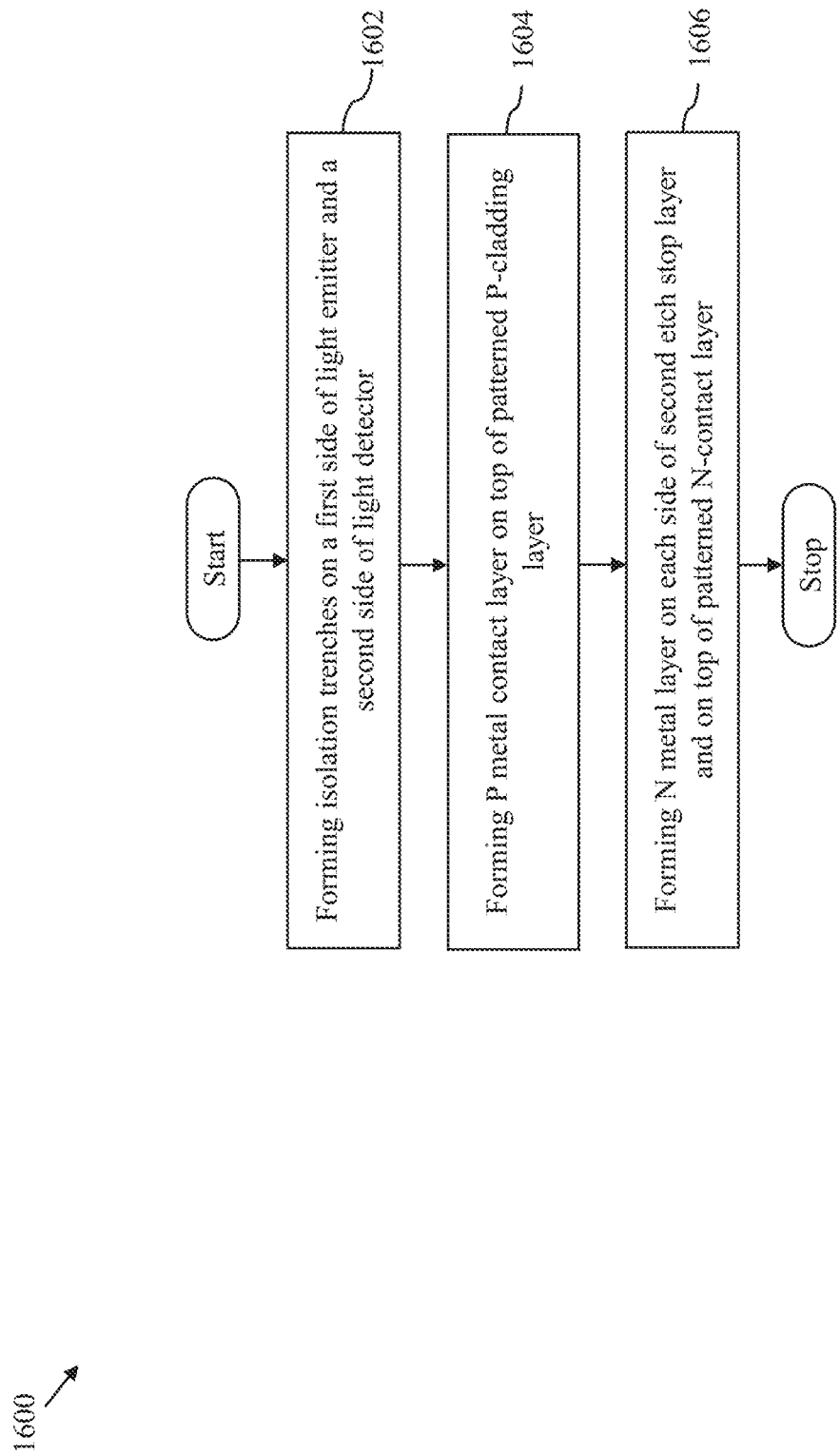
FIG. 16 represents a flowchart for forming a first isolation trench, a second isolation trench, a P metal layer, and an N metal layer of the plurality of layers of FIG. 6 in accordance with an embodiment of the present disclosure.

FIG. 16 represents a flowchart 1600 for forming the first isolation trench 620, the second isolation trench 620b, the P metal layer 616, and the N metal layer 608 in accordance with an embodiment of the present disclosure. At 1602, the first isolation trench 620 and the second isolation trench 620b are formed on a first side of the first light emitter SLED1 and a second side of the first light detector DT1. At 1604, the P metal layer 616 is formed on top of the patterned P-cladding layer 614. At 1606, the N metal layer 608 is formed by patterning the N metal layer 608 on each side of the second etch stop layer 609 and on top of the patterned N-contact layer 606.

In comparison to the conventional transmit-receive circuitry 102, the single-unit TRX-PIC module 202 offers a high-performance uniformity and quality of fabrication of the photonic integrated chip 302 as compared to piece-wise manual assembly of the optical components. Thus, the photonic integrated chip 302 is robust due to a solid-state construction of the photonic integrated chip 302 as compared to mechanically assembling the components of the conventional transmit-receive circuitry 102. Due to the implementation of the single monolithic photonic integrated chip 302, more consistent performance through various operating temperatures is obtained as there is a common temperature-controlled platform for all photonics devices in the single-unit TRX-PIC module 202 versus conventional method in which only the SLED light source 104 is temperature-controlled. In addition, significant reduction in footprint is obtained with the usage of the photonic integrated chip 302. Further, the photonic integrated chip 302 of the present disclosure may be implemented in other sensing applications that require more than three channels.

Techniques consistent with the disclosure provide, among other features, a practical implementation that includes the photonic integrated chip 302 for the FOG circuit 200. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing the disclosure, without departing from the breadth or scope.

The invention claimed is:

1. A photonic integrated chip, comprising:
a light emitter configured to emit light;
a mode-field adapter configured to at least one of (i) transmit light based on the emitted light by the light emitter and (ii) receive light;
a light detector, wherein based on a reception of the received light by the mode-field adapter, the light detector is configured to detect the received light; and
a multimode interference coupler, wherein the light emitter and the light detector are formed above the multimode interference coupler, and the mode-field adapter is formed adjacent to the multimode interference coupler, and wherein the multimode interference coupler couples the light emitter and the light detector to the mode-field adapter such that the emitted light is propagated from the light emitter to the mode-field adapter, and the multimode interference coupler couples the light detector to the mode-field adapter such that the received light is propagated from the mode-field adapter to the light detector.

2. The photonic integrated chip of claim 1, further comprising a photodiode, wherein the light emitter is coupled to the multimode interference coupler at a front facet of the light emitter, and a back facet of the light emitter is coupled to the photodiode.

3. The photonic integrated chip of claim 2, wherein a back facet of the light detector and a back facet of the photodiode are coated with an anti-reflection coating.

4. The photonic integrated chip of claim 1, wherein the light emitter is a superluminescent light emitting diode.

5. The photonic integrated chip of claim 1, wherein the light detector is a photodetector.

6. The photonic integrated chip of claim 1, wherein the photonic integrated chip is formed from a plurality of layers that comprise:
a substrate;
a passive waveguide core layer grown above the substrate, wherein the passive waveguide core layer is configured as a first core, wherein the first core is lattice-matched with the substrate, and wherein the first core is undoped;
a passive waveguide cladding layer grown on the passive waveguide core layer, wherein a first waveguide path, a second waveguide path, and a third waveguide path are formed from the passive waveguide cladding layer, and wherein an output end of the third waveguide path is tapered to form the mode-field adapter;
a first etch stop layer grown on the passive waveguide cladding layer;
an n-contact layer grown on the first etch stop layer;
a second etch stop layer grown on the n-contact layer;
an n-cladding layer grown on the second etch stop layer;
an active layer configured as a second core and grown on the n-cladding layer, wherein the second core has a lower bandgap as compared with the first core;
a p-cladding layer grown on the active layer; and
a p-metal layer grown on the p-cladding layer.

7. The photonic integrated chip of claim 6, wherein the p-cladding layer, the active layer, and the n-cladding layer are patterned to form the light emitter, wherein the light emitter is formed above the first waveguide path, and wherein the second core is tapered such that the emitted light propagates from the second core to the first core by way of adiabatic coupling between the second core and the first core.

8. The photonic integrated chip of claim 7, wherein an isolation trench is formed at a first side of the light emitter and another isolation trench is formed at a second side of the light detector.

9. The photonic integrated chip of claim 7, further comprising:
isolation trenches formed at an oblique angle near an output end of the mode-field adapter, wherein the isolation trenches are formed on the passive waveguide core layer.

10. The photonic integrated chip of claim 6, wherein the p-cladding layer, the active layer, and the n-cladding layer are patterned to form the light detector, wherein the light detector is formed above the second waveguide path, and wherein the second core is tapered such that the received light propagates from the first core to the second core by way of adiabatic coupling between the first core and the second core.

11. The photonic integrated chip of claim 6, wherein the active layer comprises a stack of quantum wells, and wherein each adjacent quantum well of the stack of quantum wells is separated by a corresponding barrier layer.

12. The photonic integrated chip of claim 6, further comprising:
a third core layer formed on the substrate, wherein the third core layer is configured as a third core and has a lower refractive index with respect to the substrate, and wherein the first core is tapered such that at least one of (i) the emitted light propagates from the first core to the third core and (ii) the received light propagates from the third core to the first core; and
a third cladding layer formed above the third core, wherein the passive waveguide core layer is formed above the third cladding layer.

13. The photonic integrated chip of claim 12, wherein the third core comprises a plurality of alternating thin Indium Gallium Arsenide Phosphide (InGaAsP) layers and thick Indium Phosphide (InP) layers, and wherein a thickness of each thin InGaAsP layer is 30-40 nanometers (nm), and a thickness of each thick InP layer is 500-550 nm.

14. The photonic integrated chip of claim 1, wherein an output end of the mode-field adapter is tapered for coupling with an optical fiber.

15. The photonic integrated chip of claim 1, wherein the photonic integrated chip is mounted and bonded by thermal-conductive materials on a ceramic submount, and wherein the photonic integrated chip is included in a fiber optic gyroscope circuit.

16. The photonic integrated chip of claim 15, wherein the photonic integrated chip is divided into a plurality of channels comprising a first channel, a second channel, and a third channel, wherein each channel of the plurality of channels is isolated from other channels of the plurality of channels, wherein the first channel includes the light emitter, the light detector, the mode-field adapter, and the multimode interference coupler, and wherein each of the second channel and the third channel comprises a corresponding light emitter, a corresponding light detector, a corresponding mode-field adapter, and a corresponding multimode interference coupler.

* * * * *